US011180162B1

United States Patent
Player

(10) Patent No.: US 11,180,162 B1
(45) Date of Patent: Nov. 23, 2021

(54) SYSTEMS AND METHODS FOR CONTROLLING VEHICLES USING AN AMODAL CUBOID BASED ALGORITHM

(71) Applicant: Argo AI, LLC, Pittsburgh, PA (US)

(72) Inventor: Kevin James Player, Gibsonia, PA (US)

(73) Assignee: Argo AI, LLC, Pittsburgh, PA (US)

(*) Notice: Subject to any disclaimer, the term of this patent is extended or adjusted under 35 U.S.C. 154(b) by 100 days.

(21) Appl. No.: 16/868,801

(22) Filed: May 7, 2020

(51) Int. Cl.
*B60W 60/00* (2020.01)
*G06F 17/11* (2006.01)
*G06K 9/00* (2006.01)

(52) U.S. Cl.
CPC .... *B60W 60/0011* (2020.02); *B60W 60/0025* (2020.02); *G06F 17/11* (2013.01); *G06K 9/00805* (2013.01)

(58) Field of Classification Search
None
See application file for complete search history.

(56) References Cited

U.S. PATENT DOCUMENTS

| | | | |
|---|---|---|---|
| 2010/0086923 A1 | 4/2010 | Donner et al. | |
| 2019/0147245 A1 | 5/2019 | Qi et al. | |
| 2019/0180467 A1 | 6/2019 | Li et al. | |
| 2019/0355171 A1 | 11/2019 | Ashley | |
| 2020/0117947 A1 | 4/2020 | Mei et al. | |
| 2020/0218913 A1* | 7/2020 | Unnikrishnan | G06K 9/6218 |
| 2021/0150228 A1* | 5/2021 | Goforth | G06K 9/00201 |

FOREIGN PATENT DOCUMENTS

| | | |
|---|---|---|
| CN | 110826499 A | 2/2020 |
| GB | 2537681 A | 10/2016 |

OTHER PUBLICATIONS

He, H. et al., "A Rapid Grid Search Method for Solving Dynamic Programming Problems in Economics", Front. Econ. China 2013, 8(2): 260-271.

(Continued)

*Primary Examiner* — James J Lee
*Assistant Examiner* — David Hatch
(74) *Attorney, Agent, or Firm* — Fox Rothschild LLP

(57) ABSTRACT

Systems/methods for controlling an Autonomous Vehicle ("AV"). The methods comprise: generating LiDAR datasets measuring a distance from AV to an object at different times; plotting each LiDAR dataset on a 3D graph; defining an amodal cuboid on each 3D graph; selecting different positions for amodal cuboid in 3D graphs; determining coordinates for an amodal cuboid center point at different positions within 3D graphs; using Center Point Coordinates ("CPCs") to compute velocity and acceleration values for the object at each time; using CPCs to compute Single Frame Score ("SFS") values; using velocity values, acceleration values and SFS values to compute scores for different cuboid positions in 3D graphs; using the scores as inputs to a Viterbi algorithm for determining a most likely sequence of states for the object given the LiDAR datasets; and using the most likely sequence of states for the object by AV to facilitate autonomous driving operation(s).

18 Claims, 14 Drawing Sheets

(56) References Cited

OTHER PUBLICATIONS

Yao, W. "Extraction and velocity estimation of vehicles in urban areas from airborne laserscanning data." PhD diss., Technische University Munchen, Nov. 29, 2010.
Li, L. et al. "Advanced 3D motion prediction for video-based dynamic point cloud compression" IEEE Transactions on Image Processing 29, Aug. 8, 2019.
Daraei, M. H. et al. "Velocity and shape from tightly-coupled LiDAR and camera." In 2017 IEEE Intelligent Vehicles Symposium (IV), pp. 60-67. IEEE, Jun. 11, 2017.
International Search Report and Written Opinion issued in PCT/US2021/027384 dated Jun. 29, 2021.

* cited by examiner

| Amodal Cuboid Position | Center Point Coordinates ("CPC") | Velocity (v) | Acceleration (a) | Single Frame Score (SFS) |
|---|---|---|---|---|
| $P1_t$ | $CPC1_t = x1_t, y1_t, z1_t$ | $v1_t = (CPC1_{t+1} - CPC1_t)^*1/fz$ | $a1_t = (v1_{t+1} - v1_t)^*1/fr$ | $SFSP1_t = |w_j|EPC1_t| + |w_k|CPC1_t|$ |
| $P2_t$ | $CPC2_t = x2_t, y2_t, z2_t$ | $v2_t = (CPC2_{t+1} - CPC2_t)^*1/fr$ | $a2_t = (v2_{t+1} - v2_t)^*1/fr$ | $SFSP2_t = |w_j|EPC2_t| + |w_k|CPC2_t|$ |
| $P3_t$ | $CPC3_t = x3_t, y3_t, z3_t$ | $v3_t = (CPC3_{t+1} - CPC3_t)^*1/fr$ | $a3_t = (v3_{t+1} - v3_t)^*1/fr$ | $SFSP3_t = |w_j|EPC3_t| + |w_k|CPC3_t|$ |
| $P4_t$ | $CPC4_t = x4_t, y4_t, z4_t$ | $v4_t = (CPC4_{t+1} - CPC4_t)^*1/fr$ | $a4_t = (v4_{t+1} - v4_t)^*1/fr$ | $SFSP4_t = |w_j|EPC4_t| + |w_k|CPC4_t|$ |
| $P1_{t+1}$ | $CPC1_{t+1} = x1_{t+1}, y1_{t+1}, z1_{t+1}$ | $v1_{t+1} = (CPC1_{t+2} - CPC1_{t+1})^*1/fr$ | $a1_{t+1} = (v1_{t+1} - v1_t)^*1/fr$ | $SFSP1_{t+1} = |w_j|EPC1_{t+1}| + |w_k|CPC1_{t+1}|$ |
| $P2_{t+1}$ | $CPC2_{t+1} = x2_{t+1}, y2_{t+1}, z2_{t+1}$ | $v2_{t+1} = (CPC2_{t+2} - CPC2_{t+1})^*1/fr$ | $a2_{t+1} = (v2_{t+1} - v2_t)^*1/fr$ | $SFSP2_{t+1} = |w_j|EPC2_{t+1}| + |w_k|CPC2_{t+1}|$ |
| $P3_{t+1}$ | $CPC3_{t+1} = x3_{t+1}, y3_{t+1}, z3_{t+1}$ | $v3_{t+1} = (CPC3_{t+2} - CPC3_{t+1})^*1/fr$ | $a3_{t+1} = (v3_{t+1} - v3_t)^*1/fr$ | $SFSP3_{t+1} = |w_j|EPC3_{t+1}| + |w_k|CPC3_{t+1}|$ |
| $P4_{t+1}$ | $CPC4_{t+1} = x4_{t+1}, y4_{t+1}, z4_{t+1}$ | $v4_{t+1} = (CPC4_{t+2} - CPC4_{t+1})^*1/fr$ | $a4_{t+1} = (v4_{t+1} - v4_t)^*1/fr$ | $SFSP4_{t+1} = |w_j|EPC4_{t+1}| + |w_k|CPC4_{t+1}|$ |
| $P1_{t+2}$ | $CPC1_{t+2} = x1_{t+2}, y1_{t+2}, z1_{t+2}$ | $v1_{t+2} = (CPC1_{t+3} - CPC1_{t+2})^*1/fr$ | $a1_{t+2} = (v1_{t+3} - v1_{t+2})^*1/fr$ | $SFSP1_{t+2} = |w_j|EPC1_{t+2}| + |w_k|CPC1_{t+2}|$ |
| $P2_{t+2}$ | $CPC2_{t+2} = x2_{t+2}, y2_{t+2}, z2_{t+2}$ | $v2_{t+2} = (CPC2_{t+3} - CPC2_{t+2})^*1/fr$ | $a2_{t+2} = (v2_{t+3} - v2_{t+2})^*1/fr$ | $SFSP2_{t+2} = |w_j|EPC2_{t+2}| + |w_k|CPC2_{t+2}|$ |
| $P3_{t+2}$ | $CPC3_{t+2} = x3_{t+2}, y3_{t+2}, z3_{t+2}$ | $v3_{t+2} = (CPC3_{t+3} - CPC3_{t+2})^*1/fr$ | $a3_{t+2} = (v3_{t+3} - v3_{t+2})^*1/fr$ | $SFSP3_{t+2} = |w_j|EPC3_{t+2}| + |w_k|CPC3_{t+2}|$ |
| $P4_{t+2}$ | $CPC4_{t+2} = x4_{t+2}, y4_{t+2}, z4_{t+2}$ | $v4_{t+2} = (CPC4_{t+3} - CPC4_{t+2})^*1/fr$ | $a4_{t+2} = (v4_{t+3} - v4_{t+2})^*1/fr$ | $SFSP4_{t+2} = |w_j|EPC4_{t+2}| + |w_k|CPC4_{t+2}|$ |
| $P1_{t+3}$ | $CPC1_{t+3} = x1_{t+3}, y1_{t+3}, z1_{t+3}$ | $v1_{t+3} = (CPC1_{t+4} - CPC1_{t+3})^*1/fr$ | $a1_{t+3} = (v1_{t+4} - v1_{t+3})^*1/fr$ | $SFSP1_{t+3} = |w_j|EPC1_{t+3}| + |w_k|CPC1_{t+3}|$ |
| $P2_{t+3}$ | $CPC2_{t+3} = x2_{t+3}, y2_{t+3}, z2_{t+3}$ | $v2_{t+3} = (CPC2_{t+4} - CPC2_{t+3})^*1/fr$ | $a2_{t+3} = (v2_{t+4} - v2_{t+3})^*1/fr$ | $SFSP2_{t+3} = |w_j|EPC2_{t+3}| + |w_k|CPC2_{t+3}|$ |
| $P3_{t+3}$ | $CPC3_{t+3} = x3_{t+3}, y3_{t+3}, z3_{t+3}$ | $v3_{t+3} = (CPC3_{t+4} - CPC3_{t+3})^*1/fr$ | $a3_{t+3} = (v3_{t+4} - v3_{t+3})^*1/fr$ | $SFSP3_{t+3} = |w_j|EPC3_{t+3}| + |w_k|CPC3_{t+3}|$ |
| $P4_{t+3}$ | $CPC4_{t+3} = x4_{t+3}, y4_{t+3}, z4_{t+3}$ | $v4_{t+3} = (CPC4_{t+4} - CPC4_{t+3})^*1/fr$ | $a4_{t+3} = (v4_{t+4} - v4_{t+3})^*1/fr$ | $SFSP4_{t+3} = |w_j|EPC4_{t+3}| + |w_k|CPC4_{t+3}|$ |

1100 Table

| State | State Values (SV) | | |
|---|---|---|---|
| state[t-1] = CPC[t-1], CPC[t] =<br><br>CPC1$_{t-1}$  CPC1$_t$<br>CPC2$_{t-1}$  CPC2$_t$<br>CPC3$_{t-1}$  CPC3$_t$<br>CPC4$_{t-1}$  CPC4$_t$ | SV1,t-1=(CPC1(t-1), CPC1(t))<br>SV2,t-1=(CPC2(t-1), CPC1(t))<br>SV3,t-1=(CPC3(t-1), CPC1(t))<br>SV4,t-1=(CPC4(t-1), CPC1(t))<br>SV5,t-1=(CPC1(t-1), CPC2(t)) | SV6,t-1=(CPC2(t-1), CPC2(t))<br>SV7,t-1=(CPC3(t-1), CPC2(t))<br>SV8,t-1=(CPC4(t-1), CPC2(t))<br>SV9,t-1=(CPC1(t-1), CPC3(t))<br>SV10,t-1=(CPC2(t-1), CPC3(t)) | SV11,t-1=(CPC3(t-1), CPC3(t))<br>SV12,t-1=(CPC4(t-1), CPC3(t))<br>SV13,t-1=(CPC1(t-1), CPC4(t))<br>SV14,t-1=(CPC2(t-1), CPC4(t))<br>SV15,t-1=(CPC3(t-1), CPC4(t))<br>SV16,t-1=(CPC4(t-1), CPC4(t)) |
| state[t] = CPC[t], CPC[t+1] =<br><br>CPC1$_t$  CPC1$_{t+1}$<br>CPC2$_t$  CPC2$_{t+1}$<br>CPC3$_t$  CPC3$_{t+1}$<br>CPC4$_t$  CPC4$_{t+1}$ | SV1,t=(CPC1(t), CPC1(t+1))<br>SV2,t=(CPC2(t), CPC1(t+1))<br>SV3,t=(CPC3(t), CPC1(t+1))<br>SV4,t=(CPC4(t), CPC1(t+1))<br>SV5,t=(CPC1(t), CPC2(t+1)) | SV6,t=(CPC2(t), CPC2(t+1))<br>SV7,t=(CPC3(t), CPC2(t+1))<br>SV8,t=(CPC4(t), CPC2(t+1))<br>SV9,t=(CPC1(t), CPC3(t+1))<br>SV10,t=(CPC2(t), CPC3(t+1)) | SV11,t=(CPC3(t), CPC3(t+1))<br>SV12,t=(CPC4(t), CPC3(t+1))<br>SV13,t=(CPC1(t), CPC4(t+1))<br>SV14,t=(CPC2(t), CPC4(t+1))<br>SV15,t=(CPC3(t), CPC4(t+1))<br>SV16,t=(CPC4(t), CPC4(t+1)) |
| state[t+1] = (CPC[t+1], CPC[t+2])<br><br>CPC1$_{t+1}$  CPC1$_{t+2}$<br>CPC2$_{t+1}$  CPC2$_{t+2}$<br>CPC3$_{t+1}$  CPC3$_{t+2}$<br>CPC4$_{t+1}$  CPC4$_{t+2}$ | SV1,t+1=(CPC1(t+1), CPC1(t+2))<br>SV2,t+1=(CPC2(t+1), CPC1(t+2))<br>SV3,t+1=(CPC3(t+1), CPC1(t+2))<br>SV4,t+1=(CPC4(t+1), CPC1(t+2))<br>SV5,t+1=(CPC1(t+1), CPC2(t+2)) | SV6,t+1=(CPC2(t+1), CPC2(t+2))<br>SV7,t+1=(CPC3(t+1), CPC2(t+2))<br>SV8,t+1=(CPC4(t+1), CPC2(t+2))<br>SV9,t+1=(CPC1(t+1), CPC3(t+2))<br>SV10,t+1=(CPC2(t+1), CPC3(t+2)) | SV11,t+1=(CPC3(t+1), CPC3(t+2))<br>SV12,t+1=(CPC4(t+1), CPC3(t+2))<br>SV13,t+1=(CPC1(t+1), CPC4(t+2))<br>SV14,t+1=(CPC2(t+1), CPC4(t+2))<br>SV15,t+1=(CPC3(t+1), CPC4(t+2))<br>SV16,t+1=(CPC4(t+1), CPC4(t+2)) |
| state[t+2] = (CPC[t+2], CPC[t+3])<br><br>CPC1$_{t+2}$  CPC1$_{t+3}$<br>CPC2$_{t+2}$  CPC2$_{t+3}$<br>CPC3$_{t+2}$  CPC3$_{t+3}$<br>CPC4$_{t+2}$  CPC4$_{t+3}$ | SV1,t+2=(CPC1(t+2), CPC1(t+3))<br>SV2,t+2=(CPC2(t+2), CPC1(t+3))<br>SV3,t+2=(CPC3(t+2), CPC1(t+3))<br>SV4,t+2=(CPC4(t+2), CPC1(t+3))<br>SV5,t+2=(CPC1(t+2), CPC2(t+3)) | SV6,t+2=(CPC2(t+2), CPC2(t+3))<br>SV7,t+2=(CPC3(t+2), CPC2(t+3))<br>SV8,t+2=(CPC4(t+2), CPC2(t+3))<br>SV9,t+2=(CPC1(t+2), CPC3(t+3))<br>SV10,t+2=(CPC2(t+2), CPC3(t+3)) | SV11,t+2=(CPC3(t+2), CPC3(t+3))<br>SV12,t+2=(CPC4(t+2), CPC3(t+3))<br>SV13,t+2=(CPC1(t+2), CPC4(t+3))<br>SV14,t+2=(CPC2(t+2), CPC4(t+3))<br>SV15,t+2=(CPC3(t+2), CPC4(t+3))<br>SV16,t+2=(CPC4(t+2), CPC4(t+3)) |

1200 Table

| State | Amodal Cuboid Position | Score (S) | SVmax |
|---|---|---|---|
| state[t] | P1t | $SP1_t = w_m SFSP1_t + w_m SFSP2_t + w_n |v[t]|^2$ | $SV_{3,t}$ |
| | P2t | $SP2_t = w_m SFSP2_t + w_m SFSP3_t + w_n |v[t]|^2$ | $SV_{10,t}$ |
| | P3t | $SP3_t = w_m SFSP3_t + w_m SFSP4_t + w_n |v[t]|^2$ | $SV_{7,t}$ |
| | P4t | $SP4_t = w_m SFSP4_t + w_m SFSP1_t + w_n |v[t]|^2$ | $SV_{5,t}$ |
| state[t+1] | P1t+1 | $SP1_{t+1} = Max\{compatible\ state\_\{t\}\}(S(state\_\{t\})) + w_m SFSP1_{t+1} + w_n |v[t+1]|^2 + w_o |a[t]|^2$ | $SV_{11,t+1}$ |
| | P2t+1 | $SP2_{t+1} = Max\{compatible\ state\_\{t\}\}(S(state\_\{t\})) + w_m SFSP2_{t+1} + w_n |v[t+1]|^2 + w_o |a[t]|^2$ | $SV_{15,t+1}$ |
| | P3t+1 | $SP3_{t+1} = Max\{compatible\ state\_\{t\}\}(S(state\_\{t\})) + w_m SFSP3_{t+1} + w_n |v[t+1]|^2 + w_o |a[t]|^2$ | $SV_{1,t+1}$ |
| | P4t+1 | $SP4_{t+1} = Max\{compatible\ state\_\{t\}\}(S(state\_\{t\})) + w_m SFSP4_{t+1} + w_n |v[t+1]|^2 + w_o |a[t]|^2$ | $SV_{9,t+1}$ |
| state[t+2] | P1t+2 | $SP1_{t+2} = Max\{compatible\ state\_\{t+1\}\}(S(state\_\{t+1\})) + w_m SFSP1_{t+2} + w_n |v[t+2]|^2 + w_o |a[t+1]|^2$ | $SV_{2,t+2}$ |
| | P2t+2 | $SP2_{t+2} = Max\{compatible\ state\_\{t+1\}\}(S(state\_\{t+1\})) + w_m SFSP2_{t+2} + w_n |v[t+2]|^2 + w_o |a[t+1]|^2$ | $SV_{1,t+2}$ |
| | P3t+2 | $SP3_{t+2} = Max\{compatible\ state\_\{t+1\}\}(S(state\_\{t+1\})) + w_m SFSP3_{t+2} + w_n |v[t+2]|^2 + w_o |a[t+1]|^2$ | $SV_{16,t+2}$ |
| | P4t+2 | $SP4_{t+2} = Max\{compatible\ state\_\{t+1\}\}(S(state\_\{t+1\})) + w_m SFSP4_{t+2} + w_n |v[t+2]|^2 + w_o |a[t+1]|^2$ | $SV_{13,t+2}$ |
| state[t+3] | P1t+3 | $SP1_{t+3} = Max\{compatible\ state\_\{t+2\}\}(S(state\_\{t+2\})) + w_m SFSP1_{t+3} + w_n |v[t+3]|^2 + w_o |a[t+2]|^2$ | $SV_{4,t+3}$ |
| | P2t+3 | $SP2_{t+3} = Max\{compatible\ state\_\{t+2\}\}(S(state\_\{t+2\})) + w_m SFSP2_{t+3} + w_n |v[t+3]|^2 + w_o |a[t+2]|^2$ | $SV_{10,t+3}$ |
| | P3t+3 | $SP3_{t+3} = Max\{compatible\ state\_\{t+2\}\}(S(state\_\{t+2\})) + w_m SFSP3_{t+3} + w_n |v[t+3]|^2 + w_o |a[t+2]|^2$ | $SV_{6,t+3}$ |
| | P4t+3 | $SP4_{t+3} = Max\{compatible\ state\_\{t+2\}\}(S(state\_\{t+2\})) + w_m SFSP4_{t+3} + w_n |v[t+3]|^2 + w_o |a[t+2]|^2$ | $SV_{8,t+3}$ |

1300 Table

FIG. 13

SYSTEMS AND METHODS FOR CONTROLLING VEHICLES USING AN AMODAL CUBOID BASED ALGORITHM

BACKGROUND

Statement of the Technical Field

The present disclosure relates generally to vehicles. More particularly, the present disclosure relates to implementing systems and methods controlling vehicles using an amodal cuboid based algorithm.

Description of the Related Art

Modern day vehicles have at least one on-board computer and have internet/satellite connectivity. The software running on these on-board computers monitor and/or control operations of the vehicles. The vehicle also comprises LiDAR detectors for detecting objects in proximity thereto. The LiDAR detectors generate LiDAR datasets that measure the distance from the vehicle to an object at a plurality of different times. These distance measurements can be used for tracking movements of the object, making predictions as to the objects trajectory, and planning paths of travel for the vehicle based on the predicted objects trajectory.

SUMMARY

The present disclosure concerns implementing systems and methods for controlling an autonomous vehicle. The methods comprise: performing operations by the autonomous vehicle to generate a plurality of LiDAR datasets that measure a distance from the autonomous vehicle to an object (e.g., a vehicle) at a plurality of different times; plotting each of the LiDAR datasets on a 3D graph; defining an amodal cuboid on each of the 3D graphs that encompasses all of the LiDAR data points in a respective one of the LiDAR datasets; selecting a plurality of different positions for the amodal cuboid in the 3D graphs; determining coordinates for a center point of the amodal cuboid at the different positions within each of the 3D graphs; using the center point coordinates to compute a plurality of velocity values and a plurality of acceleration values for the object at each of the different times; using the center point coordinates to compute a plurality of single frame score values that are each a function of (i) weighted Euclidean distances of each LiDAR point to an edge of the amodal cuboid in a given position within a respective one of the 3D graphs, (ii) weighted Euclidean distances to the center point of the amodal cuboid in the given position within the respective one of the 3D graphs, and (iii) weighted edges according to a probability of occlusion; using the velocity values, acceleration values and single frame score values to respectively compute a plurality of scores for the different cuboid positions in the 3D graphs; using the plurality of scores as inputs to a Viterbi algorithm for determining a most likely sequence of states for the object given the LiDAR datasets; and using the most likely sequence of states for the object by the autonomous vehicle to facilitate at least one autonomous driving operation (e.g., object movement tracking, object trajectory predicting, vehicle movement/motion planning, and collision avoidance).

In some scenarios, the different positions of the amodal cuboid within each of the 3D graphs are arbitrarily selected. The LiDAR datasets may be processed by an on-board computing device of the autonomous vehicle to determine the most likely sequence of states for the object. Additionally or alternatively, the LiDAR datasets may be processed by a remote computing device. In this case, the methods further comprise providing the plurality of LiDAR datasets to a remote computing device where the most likely sequence of states for the object is determined.

Each velocity value may be a function of (i) a center point coordinate for the amodal cuboid in a given position while encompassing data points of a first LiDAR dataset of the plurality of LiDAR datasets that was acquired at a given time, (ii) a center point coordinate of the amodal cuboid in the given position while encompassing data points of a second LiDAR dataset of the plurality of LiDAR datasets that was acquired at immediately subsequent time, and (iii) a LiDAR frame rate.

Each acceleration value may be a function of (i) a velocity of the object computed using a center point coordinate for the amodal cuboid in a given position while encompassing data points of a first LiDAR dataset of the plurality of LiDAR datasets that was acquired at a given time, (ii) a velocity of the object using a center point coordinate for the amodal cuboid in the given position while encompassing data points of a second LiDAR dataset of the plurality of LiDAR datasets that was acquired at an immediately subsequent time, and (iii) a LiDAR frame rate.

Each single frame score value may be defined by the mathematical equation $$SFS_t = |w_j L_{EPC1t}| + |w_k L_{CPC1t}|,$$

where: $SFS_t$ represents a single frame score associated with the amodal cuboid that is in a given position in a given 3D graph so as to encompass a given LiDAR dataset of the plurality of LiDAR datasets that was acquired at time t; $w_j$ and $w_k$ represent weights; $L_{EPC1t}$ represents Euclidean distances of LiDAR data points to an edge of the amodal cuboid in the given position within the given 3D graph; and $L_{CPC1t}$ represents Euclidean distances of LiDAR data points to a center point of the amodal cuboid in the given position within the given 3D graph.

Each score may be defined by the mathematical equation $$S_t = \text{Max}\{\text{compatible state}\_\{t-1\}\}(S(\text{state}\_\{t-1\}) + w_m SFS_{t+1} + w_n |v[t+1]|^2 + w_o |a[t]|^2)$$

where: $S_t$ represents a score associated with a first LiDAR dataset of the LiDAR datasets that was acquired at a given time and that has plotted data points which are encompassed by the amodal cuboid having a given position within a given 3D graph; $\text{Max}\{\text{compatible state}\_\{t-1\}\}$ represents a maximum value over all states at time t−1; $S(\text{state}\_\{t-1\})$ represents a score computed for a state at t−1; $w_m$, $w_n$, and $w_o$ represent weights; $SFS_{t+1}$ represents a single frame score previously computed for the amodal cuboid encompassing a second LiDAR dataset of the plurality of LiDAR datasets that was acquired at an immediately subsequent time; $|v[t+1]|$ represents an L2-norm of the velocity values previously computed for the second LiDAR dataset; and $|a[t]|$ represents an L2-norm of the acceleration values previously computed for the first LiDAR dataset.

BRIEF DESCRIPTION OF THE DRAWINGS

The present solution will be described with reference to the following drawing figures, in which like numerals represent like items throughout the figures.

FIGS. 6-13 each provide an illustration that is useful for understanding for understanding the amodal cuboid based algorithm of the present solution.

DETAILED DESCRIPTION

Figure 1:
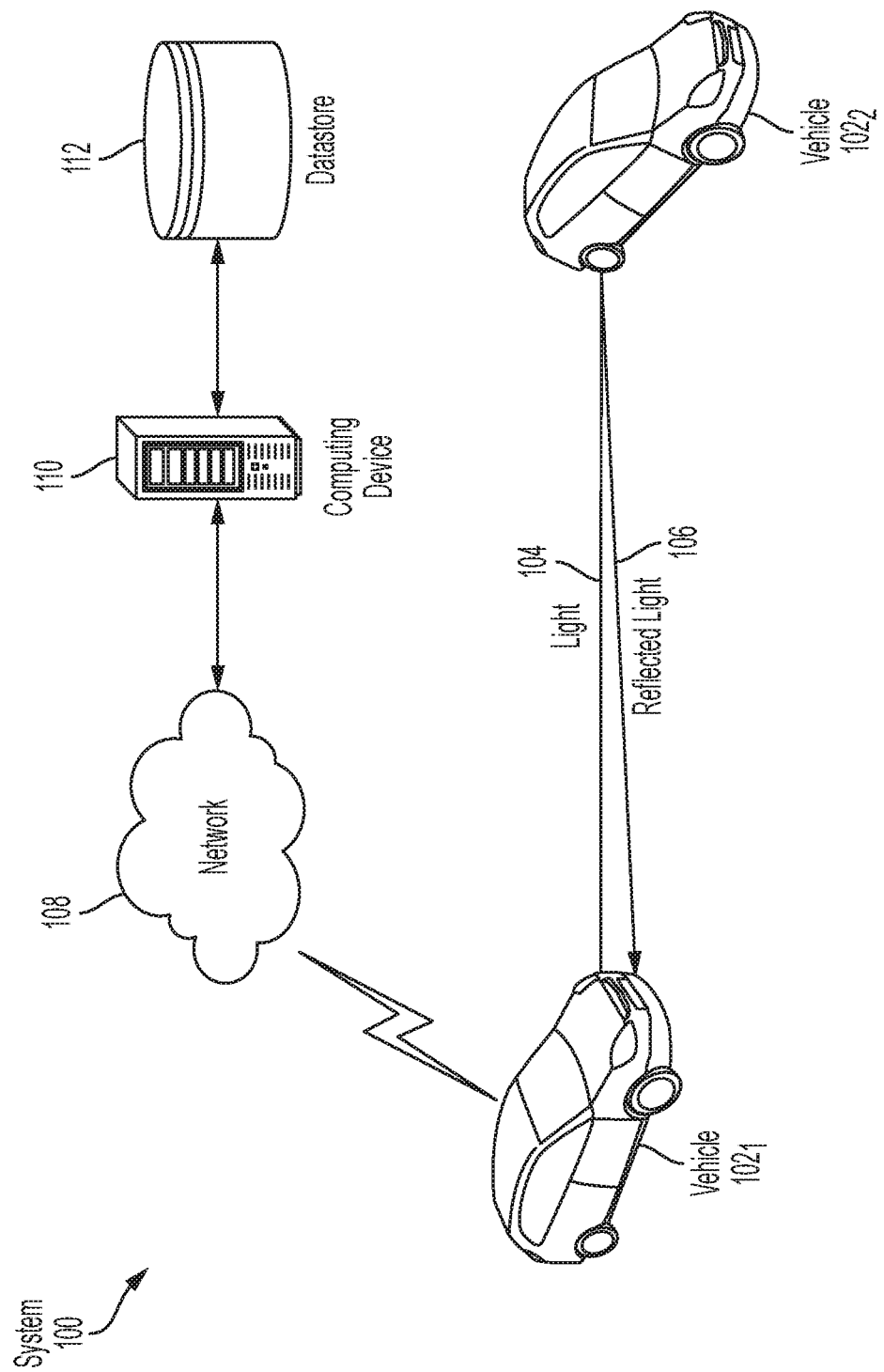
FIG. 1 is an illustration of an illustrative system.

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to." Definitions for additional terms that are relevant to this document are included at the end of this Detailed Description.

An "electronic device" or a "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions.

The terms "memory," "memory device," "data store," "data storage facility" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices.

The terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process.

The term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones and the like. An "autonomous vehicle" is a vehicle having a processor, programming instructions and drivetrain components that are controllable by the processor without requiring a human operator. An autonomous vehicle may be fully autonomous in that it does not require a human operator for most or all driving conditions and functions, or it may be semi-autonomous in that a human operator may be required in certain conditions or for certain operations, or that a human operator may override the vehicle's autonomous system and may take control of the vehicle.

In this document, when terms such as "first" and "second" are used to modify a noun, such use is simply intended to distinguish one item from another, and is not intended to require a sequential order unless specifically stated. In addition, terms of relative position such as "vertical" and "horizontal", or "front" and "rear", when used, are intended to be relative to each other and need not be absolute, and only refer to one possible position of the device associated with those terms depending on the device's orientation.

Real-time prediction of actions by drivers of other vehicles and pedestrians is a challenge for on-road semi-autonomous or autonomous vehicle applications. Such real-time prediction is particularly challenging when the drivers and/or pedestrians break traffic rules. Systematically assuming the worst case action from the drivers and/or pedestrians will paralyze the self-driving vehicle, but erroneously optimistic predictions can result in unsafe autonomous vehicle behavior.

This document describes methods and systems that are directed to addressing the problems described above, and/or other issues. Accordingly, the present solution concerns systems and methods for controlling vehicles using an amodal cuboid based algorithm. The methods generally involve: performing operations by an autonomous vehicle to generate a plurality of LiDAR datasets that measure a distance from the autonomous vehicle to a first object at a plurality of different times; plotting each of the LiDAR datasets on a 3D graph; defining an amodal cuboid on each of the 3D graphs that encompasses all of the LiDAR data points in a respective one of the LiDAR datasets; arbitrarily selecting a plurality of different positions for the amodal cuboid in the 3D graphs; determining coordinates for a center point of the amodal cuboid at the different positions within each of the 3D graphs; using the center point coordinates to compute a plurality of velocity and acceleration values for the object at each of the different times; using the center point coordinates to compute a plurality of single frame score values that are each a function of (i) weighted Euclidean distances of each LiDAR point to an edge of the amodal cuboid in a given position within a respective one of the 3D graphs, (ii) weighted Euclidean distances to the center point of the amodal cuboid in the given position within the respective one of the 3D graphs, and (iii) weighted edges according to a probability of occlusion; using the velocity values, acceleration values and single frame score values to respectively compute a plurality of scores for the different cuboid positions in the 3D graphs; using the plurality of scores as inputs to a Viterbi algorithm for determining a most likely sequence of states for the object given the LiDAR datasets; and using the most likely sequence of states for the object by the autonomous vehicle to facilitate tracking of object movements, predictions of object trajectories, planning of vehicle movement/motion, and/or collision avoidance.

Notably, the present solution is being described herein in the context of an autonomous vehicle. The present solution is not limited to autonomous vehicle applications. The present solution can be used in other applications such as robotic application, radar system application, metric applications, and/or system performance applications.

Illustrative Systems

Referring now to FIG. 1, there is provided an illustration of an illustrative system 100. System 100 comprises a vehicle $102_1$ that is traveling along a road in a semi-autonomous or autonomous manner. Vehicle $102_1$ is also referred to herein as an Autonomous Vehicle ("AV"). The AV $102_1$ can include, but is not limited to, a land vehicle (as shown in FIG. 1), an aircraft, or a watercraft.

AV $102_1$ is generally configured to detect objects in proximity thereto. The objects can include, but are not limited to, a vehicle $102_2$, cyclist (not shown) (such as a rider of a bicycle, electric scooter, motorcycle, or the like) and/or a pedestrian (not shown). When such a detection is made, AV $102_1$ performs operations to: generate one or more possible object trajectories for the detected object; and analyze at least one of the generated possible object trajectories to determine whether or not there is an undesirable level of risk that a collision will occur between the AV and object in a threshold period of time (e.g., 1 minute). If so, the AV $102_1$ performs operations to determine whether the collision can be avoided if a given vehicle trajectory is followed by the AV $102_1$ and any one of a plurality of dynamically generated emergency maneuvers is performed in pre-defined time period (e.g., N milliseconds). If the collision can be avoided, then the AV $102_1$ takes no action or optionally performs a cautious maneuver (e.g., mildly slows down). In contrast, if the collision cannot be avoided, then the AV $102_1$ immediately takes an emergency maneuver (e.g., brakes and/or changes direction of travel).

Such collision avoidance functions of the AV $102_1$ are facilitated using LiDAR datasets generated by an onboard LiDAR detector. The LiDAR detector generally measures the distance to an object $102_2$ by illuminating the object $102_2$ with light 104 (e.g., a laser light) and measuring the reflected light 106 with an onboard sensor. The LiDAR detector generates a LiDAR dataset at a plurality of times t, t+1, t+2, . . . , t+n. The LiDAR datasets are processed by an onboard computing device of the AV $102_1$ and/or by a remote computing device 110 to obtain a most likely sequence of states for the object given the LiDAR datasets. In this regard, the LiDAR datasets may be communicated from the AV $102_1$ to the remote computing device 110 over a network 108 (e.g., the Internet) via wired and/or wireless connections. The LiDAR datasets may also be stored on a removable memory of the AV $102_1$, which may be manually removed from the AV $102_1$ and connected to the remote computing device 110. The LiDAR datasets may additionally be stored in a remote datastore 112 (e.g., a database).

The most likely sequence of states for the object $102_2$ are then used to train a radar based algorithm employed by the autonomous vehicle to more accurately determine the velocity and acceleration of any further detected objects. Thereafter, the AV $102_1$ may use the velocity and acceleration values generated by the trained radar based algorithm to facilitate collision avoidance with a greater degree of confidence.

Figure 2:
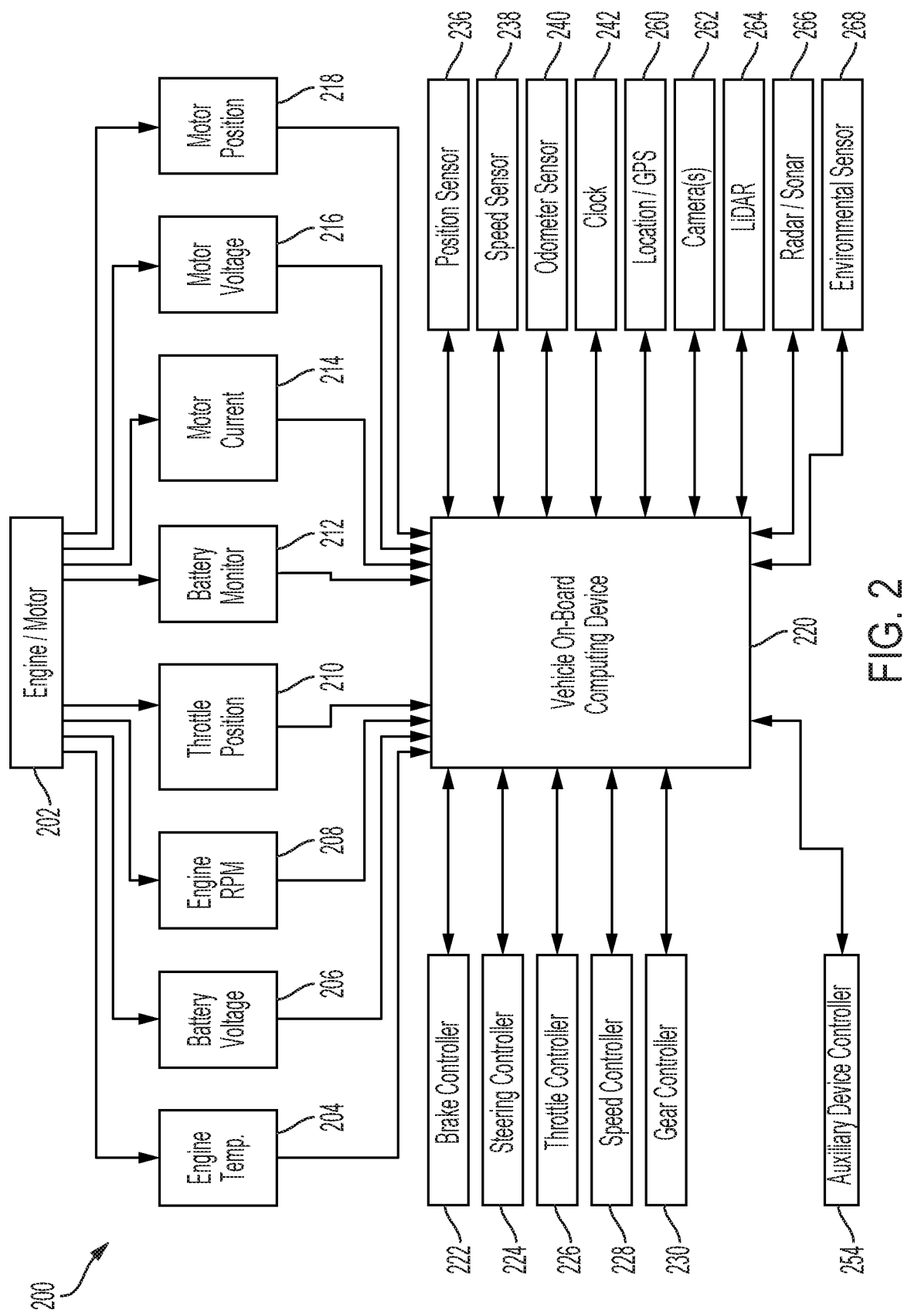
FIG. 2 is an illustration of an illustrative architecture for a vehicle.

Referring now to FIG. 2, there is provided an illustration of an illustrative system architecture 200 for a vehicle. Vehicles $102_1$ and/or $102_2$ of FIG. 1 can have the same or similar system architecture as that shown in FIG. 2. Thus, the following discussion of system architecture 200 is sufficient for understanding vehicle(s) $102_1$, $102_2$ of FIG. 1.

As shown in FIG. 2, the vehicle 200 includes an engine or motor 202 and various sensors 204-218 for measuring various parameters of the vehicle. In gas-powered or hybrid vehicles having a fuel-powered engine, the sensors may include, for example, an engine temperature sensor 204, a battery voltage sensor 206, an engine Rotations Per Minute ("RPM") sensor 208, and a throttle position sensor 210. If the vehicle is an electric or hybrid vehicle, then the vehicle may have an electric motor, and accordingly will have sensors such as a battery monitoring system 212 (to measure current, voltage and/or temperature of the battery), motor current 214 and voltage 216 sensors, and motor position sensors such as resolvers and encoders 218.

Operational parameter sensors that are common to both types of vehicles include, for example: a position sensor 236 such as an accelerometer, gyroscope and/or inertial measurement unit; a speed sensor 238; and an odometer sensor 240. The vehicle also may have a clock 242 that the system uses to determine vehicle time during operation. The clock 242 may be encoded into the vehicle on-board computing device, it may be a separate device, or multiple clocks may be available.

The vehicle also will include various sensors that operate to gather information about the environment in which the vehicle is traveling. These sensors may include, for example: a location sensor 260 (e.g., a Global Positioning System ("GPS") device); object detection sensors such as one or more cameras 262; a LiDAR sensor system 264; and/or a radar and/or a sonar system 266. The sensors also may include environmental sensors 268 such as a precipitation sensor and/or ambient temperature sensor. The object detection sensors may enable the vehicle to detect objects that are within a given distance range of the vehicle 200 in any direction, while the environmental sensors collect data about environmental conditions within the vehicle's area of travel.

During operations, information is communicated from the sensors to an on-board computing device 220. The on-board computing device 220 analyzes the data captured by the sensors and optionally controls operations of the vehicle based on results of the analysis. For example, the on-board computing device 220 may control: braking via a brake controller 232; direction via a steering controller 224; speed and acceleration via a throttle controller 226 (in a gas-powered vehicle) or a motor speed controller 228 (such as a current level controller in an electric vehicle); a differential gear controller 230 (in vehicles with transmissions); and/or other controllers.

Geographic location information may be communicated from the location sensor 260 to the on-board computing device 220, which may then access a map of the environment that corresponds to the location information to determine known fixed features of the environment such as streets, buildings, stop signs and/or stop/go signals. Captured images from the cameras 262 and/or object detection information (captured from sensors such as LiDAR 264 is communicated from those sensors) to the on-board computing device 220. The object detection information and/or captured images are processed by the on-board computing device 220 to detect objects in proximity to the vehicle 200. Any known or to be known technique for making an object detection based on sensor data and/or captured images can be used in the embodiments disclosed in this document.

When the on-board computing device 220 detects a moving object, the on-board computing device 220 will generate one or more possible object trajectories for the detected object, and analyze the possible object trajectories to assess the risk of a collision between the object and the AV. If the risk exceeds an acceptable threshold, the on-board computing device 220 performs operations to determine whether the collision can be avoided if the AV follows a defined vehicle trajectory and/or implements one or more dynamically generated emergency maneuvers is performed in a pre-defined time period (e.g., N milliseconds). If the collision can be avoided, then the on-board computing device 220 may cause the vehicle 200 to perform a cautious maneuver (e.g., mildly slow down, accelerate, or swerve). In contrast, if the collision cannot be avoided, then the onboard computing device 220 will cause the vehicle 200 to take an emergency maneuver (e.g., brake and/or change direction of travel).

Figure 3:
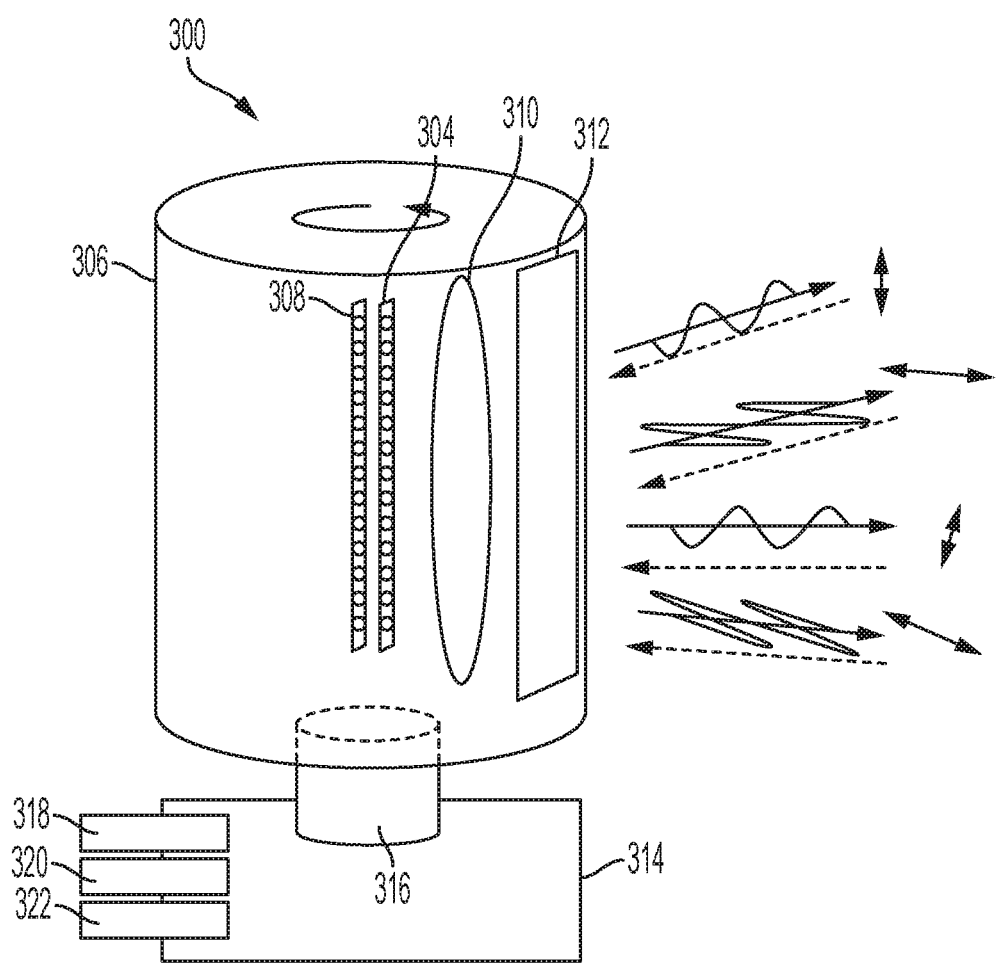
FIG. 3 is an illustration of an illustrative architecture for a LiDAR system employed by the vehicle shown in FIG. 2.

Referring now to FIG. 3, there is provided an illustration of an illustrative LiDAR system 300. LiDAR system 264 of FIG. 2 may be the same as or substantially similar to the LiDAR system 300. As such, the discussion of LiDAR system 300 is sufficient for understanding LiDAR system 264 of FIG. 2.

As shown in FIG. 3, the LiDAR system 300 includes a housing 306 which may be rotatable 360° about a central axis such as hub or axle 316. The housing may include an emitter/receiver aperture 312 made of a material transparent to light. Although a single aperture is shown in FIG. 2, the present solution is not limited in this regard. In other scenarios, multiple apertures for emitting and/or receiving light may be provided. Either way, the LiDAR system 300 can emit light through one or more of the aperture(s) 312 and receive reflected light back toward one or more of the aperture(s) 211 as the housing 306 rotates around the internal components. In an alternative scenarios, the outer shell of housing 306 may be a stationary dome, at least partially made of a material that is transparent to light, with rotatable components inside of the housing 306.

Inside the rotating shell or stationary dome is a light emitter system 304 that is configured and positioned to generate and emit pulses of light through the aperture 312 or through the transparent dome of the housing 306 via one or more laser emitter chips or other light emitting devices. The emitter system 304 may include any number of individual emitters (e.g., 8 emitters, 64 emitters, or 128 emitters). The emitters may emit light of substantially the same intensity or of varying intensities. The individual beams emitted by the light emitter system 304 will have a well-defined state of polarization that is not the same across the entire array. As an example, some beams may have vertical polarization and other beams may have horizontal polarization. The LiDAR system will also include a light detector 308 containing a photodetector or array of photodetectors positioned and configured to receive light reflected back into the system. The emitter system 304 and light detector 308 would rotate with the rotating shell, or they would rotate inside the stationary dome of the housing 306. One or more optical element structures 310 may be positioned in front of the light emitting unit 304 and/or the light detector 308 to serve as one or more lenses or waveplates that focus and direct light that is passed through the optical element structure 310.

One or more optical element structures 310 may be positioned in front of a mirror 312 to focus and direct light that is passed through the optical element structure 310. As shown below, the system includes an optical element structure 310 positioned in front of the mirror 312 and connected to the rotating elements of the system so that the optical element structure 310 rotates with the mirror 312. Alternatively or in addition, the optical element structure 310 may include multiple such structures (for example lenses and/or waveplates). Optionally, multiple optical element structures 310 may be arranged in an array on or integral with the shell portion of the housing 306.

Optionally, each optical element structure 310 may include a beam splitter that separates light that the system receives from light that the system generates. The beam splitter may include, for example, a quarter-wave or half-wave waveplate to perform the separation and ensure that received light is directed to the receiver unit rather than to the emitter system (which could occur without such a waveplate as the emitted light and received light should exhibit the same or similar polarizations).

The LiDAR system will include a power unit 318 to power the light emitting unit 304, a motor 316, and electronic components. The LiDAR system will also include an analyzer 314 with elements such as a processor 322 and non-transitory computer-readable memory 320 containing programming instructions that are configured to enable the system to receive data collected by the light detector unit, analyze it to measure characteristics of the light received, and generate information that a connected system can use to make decisions about operating in an environment from which the data was collected. Optionally, the analyzer 314 may be integral with the LiDAR system 300 as shown, or some or all of it may be external to the LiDAR system and communicatively connected to the LiDAR system via a wired or wireless communication network or link.

Figure 4:
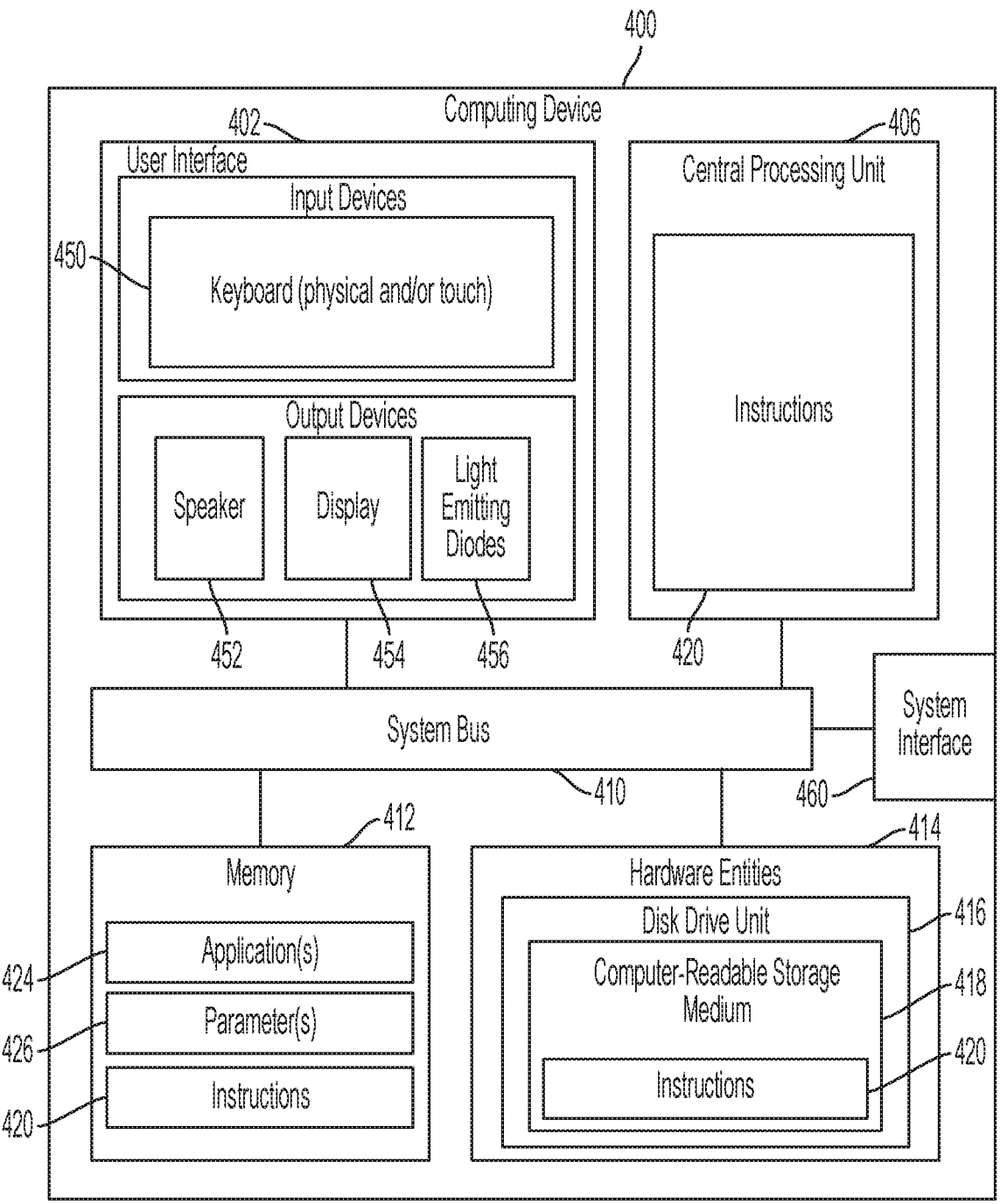
FIG. 4 is an illustration of an illustrative computing device.

Referring now to FIG. 4, there is provided an illustration of an illustrative architecture for a computing device 400. The computing device 110 of FIG. 1 and/or the vehicle on-board computing device 220 of FIG. 2 is/are the same as or similar to computing device 300. As such, the discussion of computing device 300 is sufficient for understanding the computing device 110 of FIG. 1 and the vehicle on-board computing device 220 of FIG. 2.

Computing device 400 may include more or less components than those shown in FIG. 4. However, the components shown are sufficient to disclose an illustrative solution implementing the present solution. The hardware architecture of FIG. 4 represents one implementation of a representative computing device configured to operate a vehicle, as described herein. As such, the computing device 400 of FIG. 4 implements at least a portion of the method(s) described herein.

Some or all components of the computing device 400 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 4, the computing device 400 comprises a user interface 402, a Central Processing Unit ("CPU") 406, a system bus 410, a memory 412 connected to and accessible by other portions of computing device 400 through system bus 410, a system interface 460, and hardware entities 414 connected to system bus 410. The user interface can include input devices and output devices, which facilitate user-software interactions for controlling operations of the computing device 400. The input devices include, but are not limited to, a physical and/or touch keyboard 450. The input devices can be connected to the computing device 400 via a wired or wireless connection (e.g., a Bluetooth® connection). The output devices include, but are not limited to, a speaker 452, a display 454, and/or light emitting diodes 456. System interface 460 is configured to facilitate wired or wireless communications to and from external devices (e.g., network nodes such as access points, etc.).

At least some of the hardware entities 414 perform actions involving access to and use of memory 412, which can be a Random Access Memory ("RAM"), a disk drive, flash memory, a Compact Disc Read Only Memory ("CD-ROM") and/or another hardware device that is capable of storing instructions and data. Hardware entities 414 can include a disk drive unit 416 comprising a computer-readable storage medium 418 on which is stored one or more sets of instructions 420 (e.g., software code) configured to implement one or more of the methodologies, procedures, or functions described herein. The instructions 420 can also reside, completely or at least partially, within the memory 412 and/or within the CPU 406 during execution thereof by the computing device 400. The memory 412 and the CPU 406 also can constitute machine-readable media. The term "machine-readable media", as used here, refers to a single medium or multiple media (e.g., a centralized or distributed database, and/or associated caches and servers) that store the one or more sets of instructions 420. The term "machine-readable media", as used here, also refers to any medium that is capable of storing, encoding or carrying a set of instructions 420 for execution by the computing device 400 and that cause the computing device 400 to perform any one or more of the methodologies of the present disclosure.

Illustrative Methods

Figure 5A:
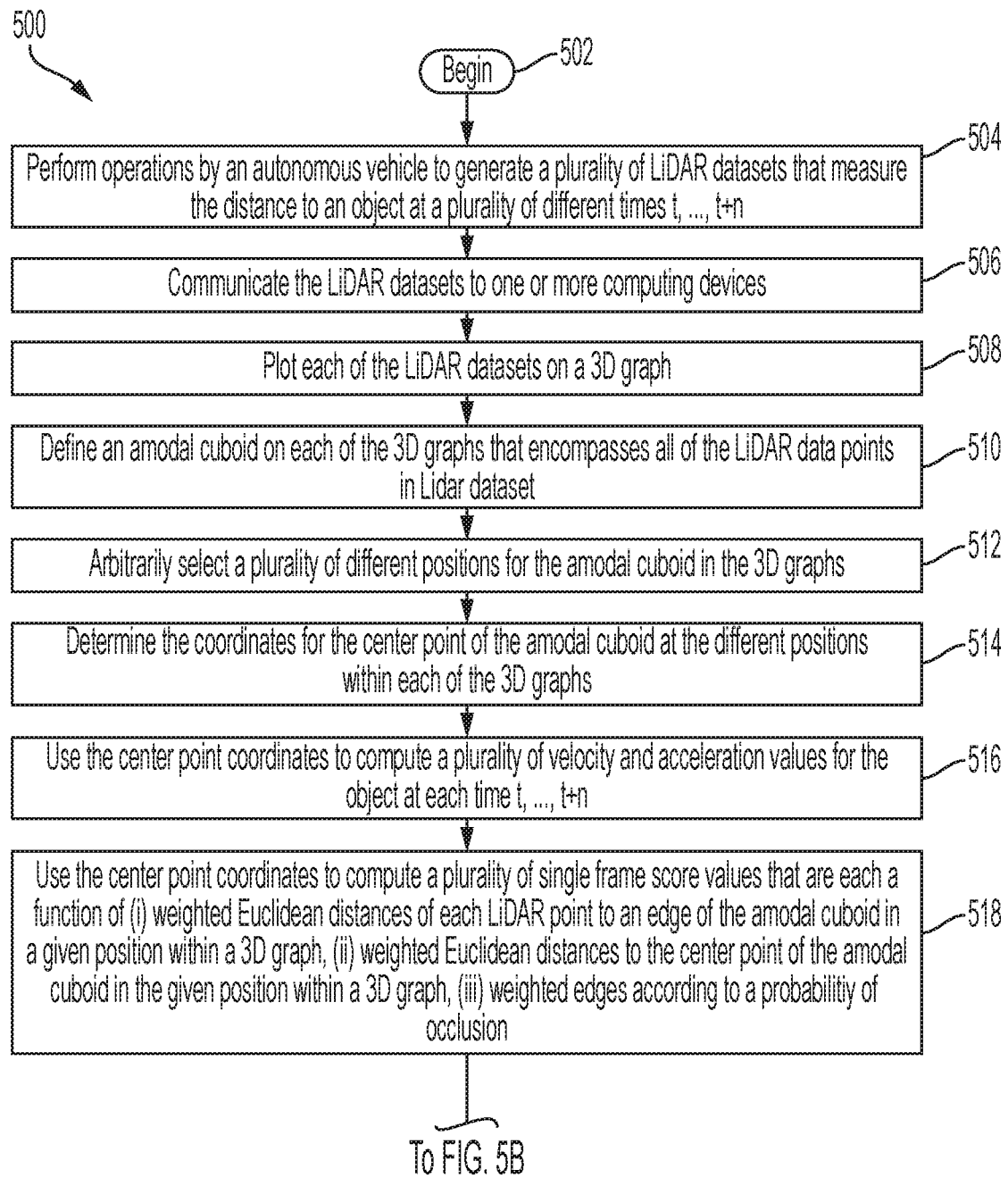
FIGS. 5A-5B (collectively referred to herein as "FIG. 5") provides a flow diagram of an illustrative method for controlling an autonomous vehicle using an amodal cuboid based algorithm.
Figure 5B:
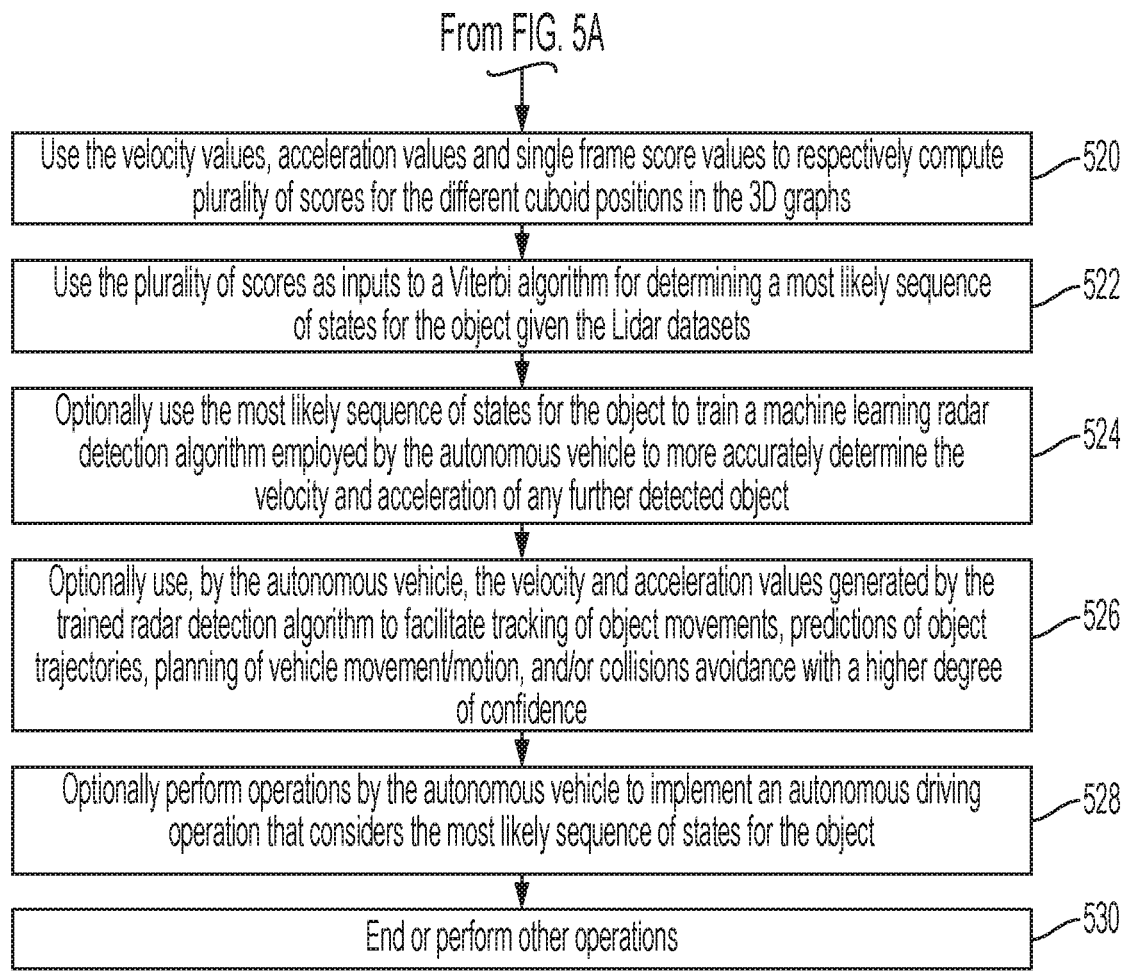
Figure 6:
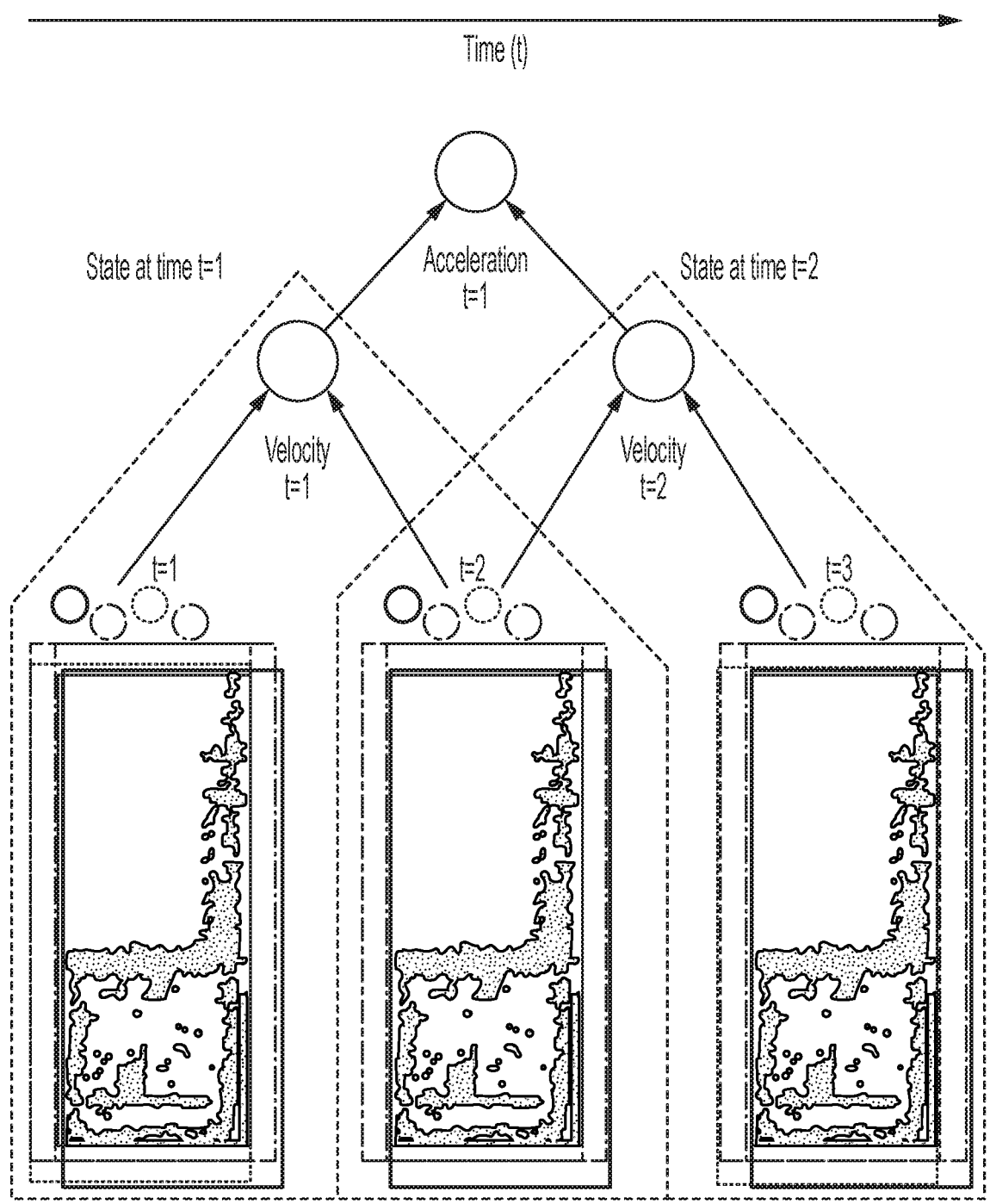

Referring now to FIG. 5, there is provided a flow diagram of an illustrative method 500 for controlling vehicles using an amodal cuboid based algorithm. Method 500 begins with 502 and continues with 504 where an autonomous vehicle (e.g., AV $102_1$ of FIG. 1 and/or 200 of FIG. 2) performs operations to generate a plurality of LiDAR datasets that measure a distance from the autonomous vehicle to a first object (e.g., vehicle $102_2$ of FIG. 1) at a plurality of different times t, t+1, t+2, t+3, . . . , t+n. The LiDAR datasets are generated by a LiDAR system (e.g., LiDAR system 264 of FIG. 2 and/or 300 of FIG. 3) onboard the autonomous vehicle. Techniques for generating LiDAR datasets are well known in the art, and therefore will not be described here. Any known or to be known technique for generating LiDAR datasets can used here. The LiDAR datasets are then communicated in 506 to one or more computing devices (e.g., remote computing device 110 of FIG. 1 and/or vehicle on-board computing device 220 of FIG. 2).

At the computing device, the LiDAR datasets are each plotted on a 3D graph having an x-axis, a y-axis and a z-axis. An illustration of a LiDAR dataset 702 plotted on a graph 700 is provided in FIG. 7. Notably, the graph 700 only shows the 2D point of view from the x-axis and y-axis simply for ease of illustration. Techniques for plotting LiDAR datasets on 3D graphs are well known in the art, and therefore will not be described here. Any known or to be known technique for plotting LiDAR datasets on 3D graphs can be used here.

Figure 7:
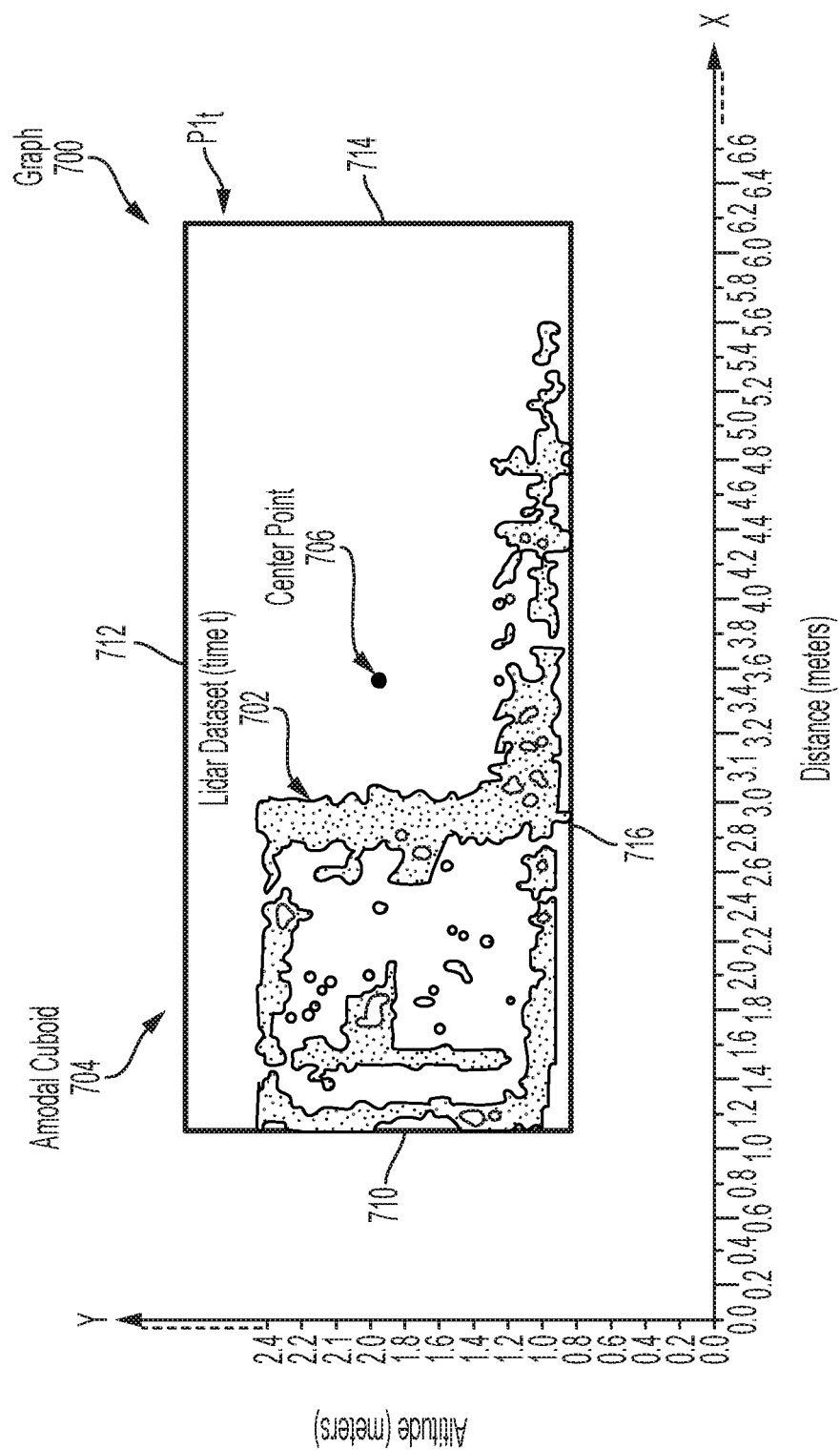

Next in 510, an amodal cuboid is defined on each of the 3D graphs. An amodal cuboid is a 3D oriented bounded box that represents (i) a heading of the object (e.g., object $102_2$ of FIG. 1) and (ii) the full extent of the object (e.g., object $102_2$ of FIG. 1). In this regard, the amodal cuboid encompasses all of the LiDAR data points on the 3D graph. An illustration showing an illustrative amodal cuboid 704 defined on a graph 700 is provided in FIG. 7. As shown in FIG. 7, all of the data points of a LiDAR dataset 702 reside within the amodal cuboid 704. The present solution is not limited to the particulars of this illustration. Techniques for defining a cuboid on a 3D graph are well known in the art, and therefore will not be described here. Any known or to be known technique for defining a cuboid on a 3D graph can be used herein.

Next in 512, operations are performed to arbitrarily select a plurality of different positions for the amodal cuboid in the 3D graphs. Any number of different positions can be selected in accordance with a given application. Notably, the only restriction on this selection operation is that all of the data points of the LiDAR dataset must be contained in the amodal cuboid at any given selected position in the 3D graph.

Figure 8:
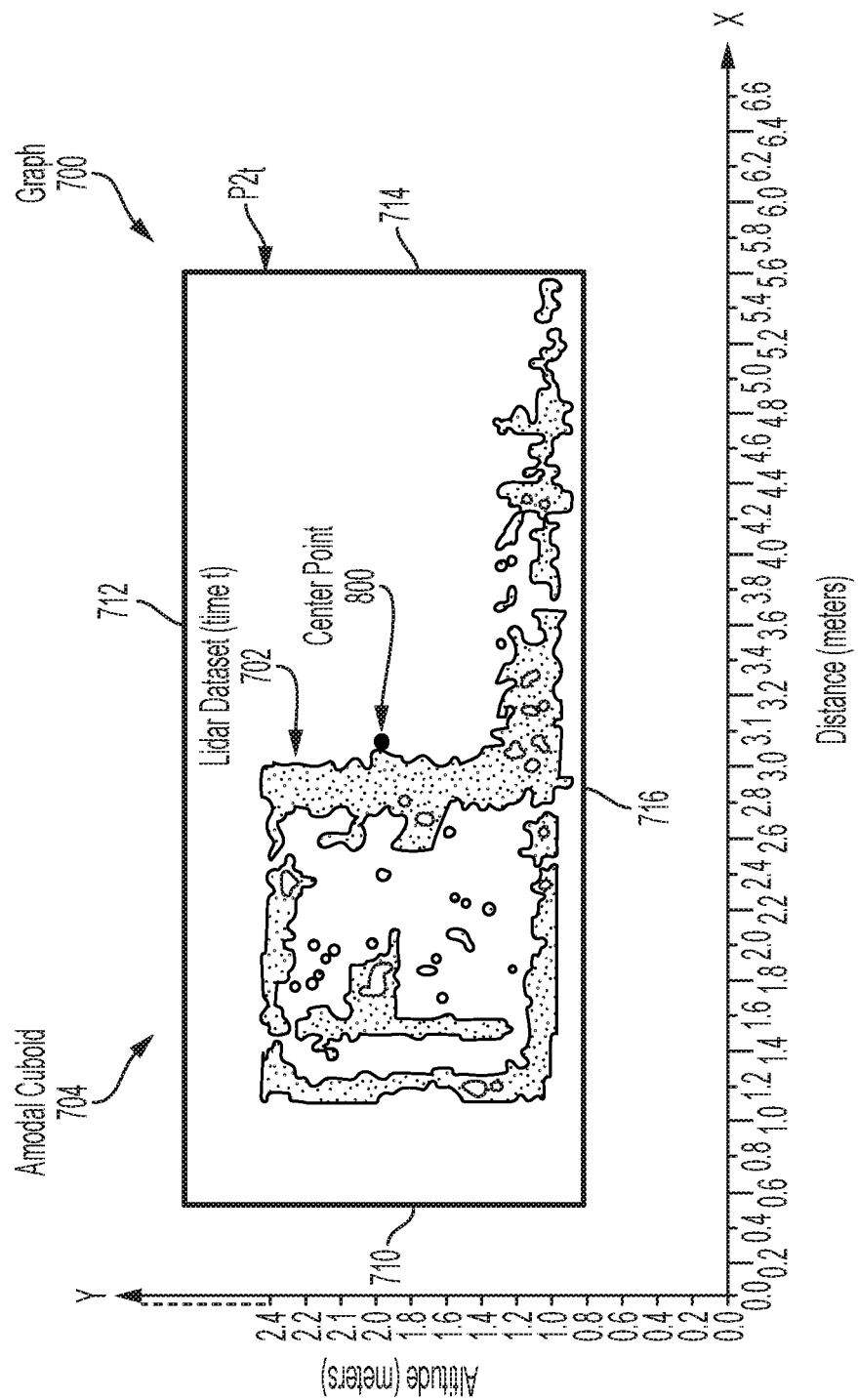
Figure 9:
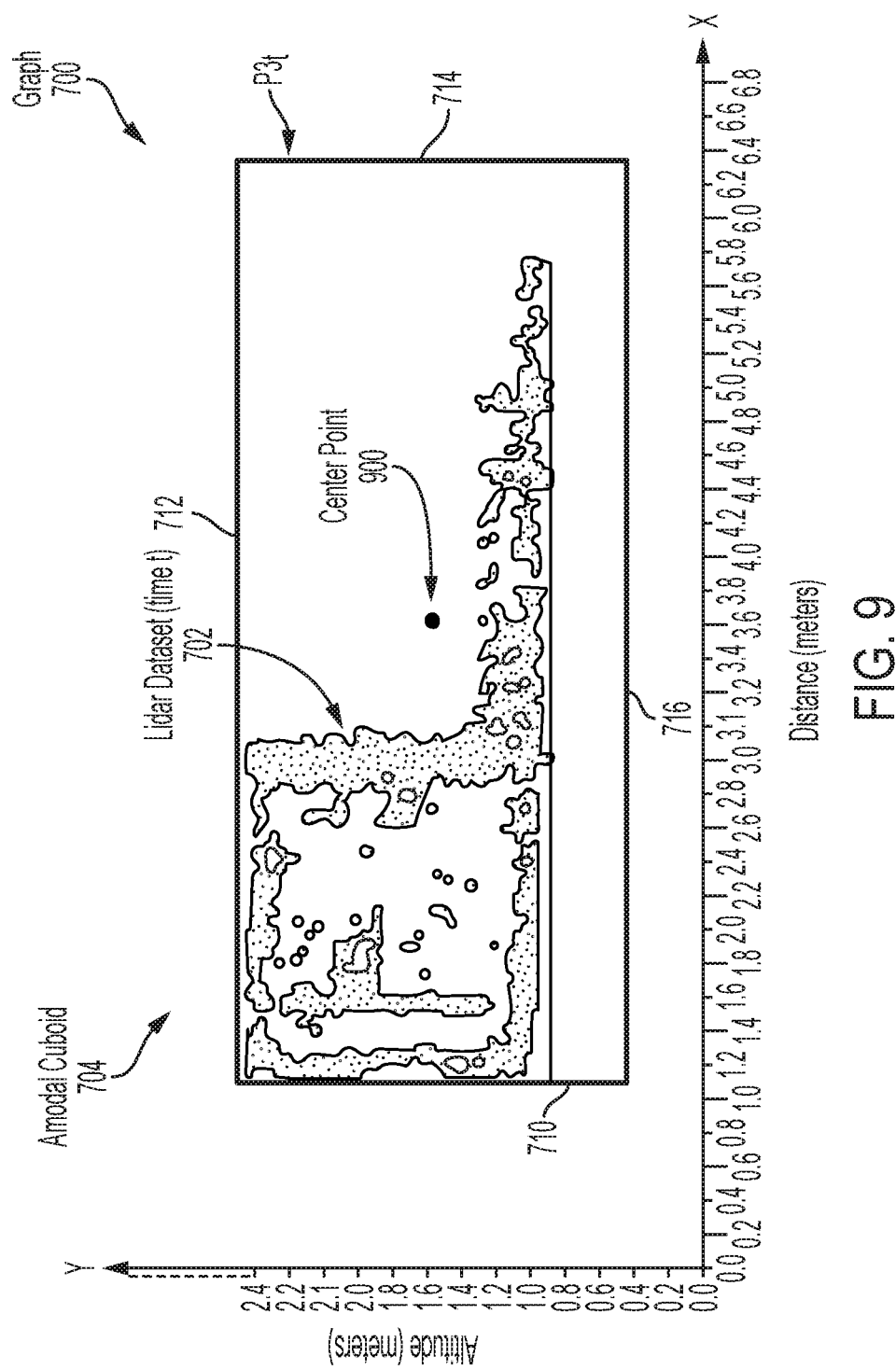
Figure 10:
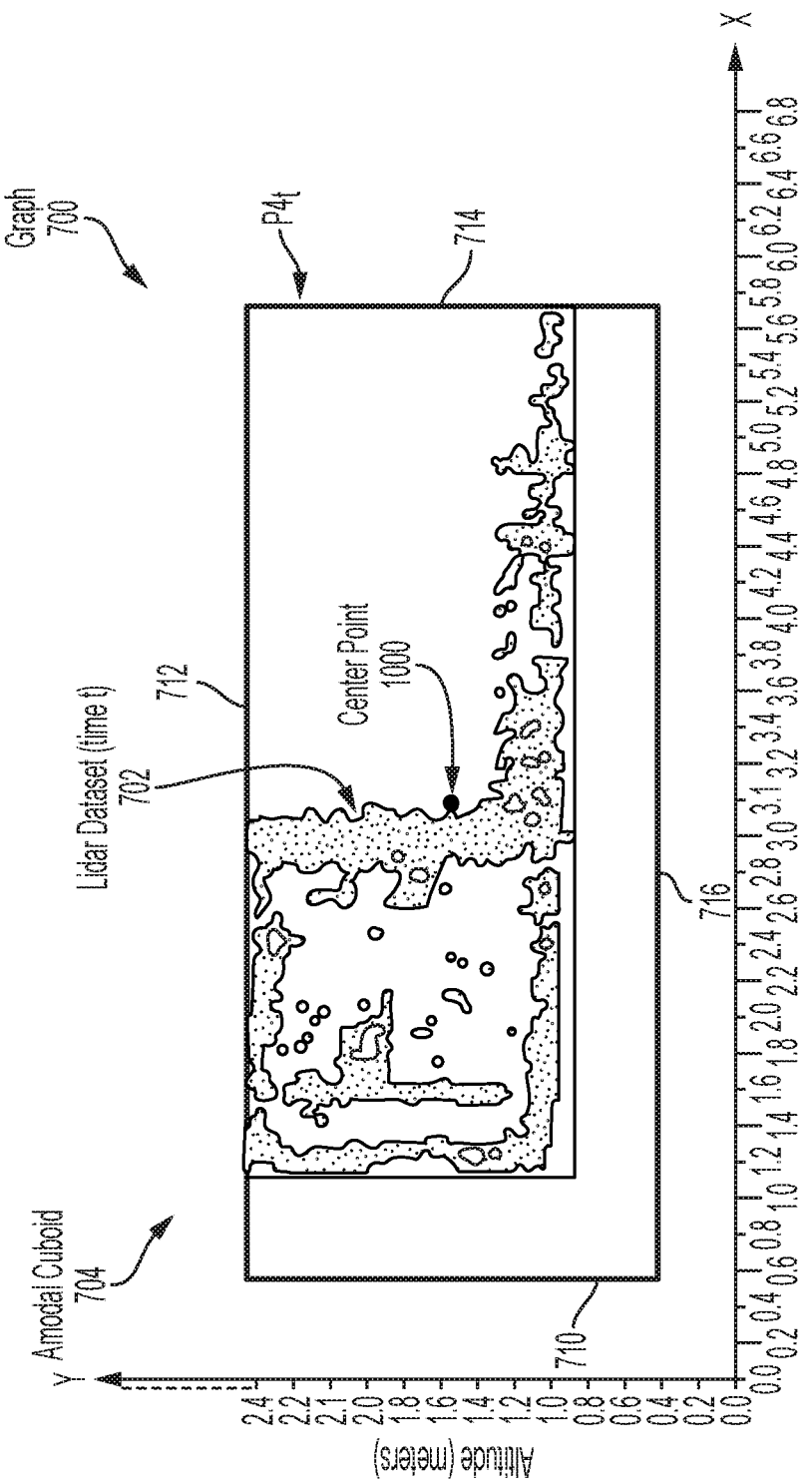

Illustrations showing the amodal cuboid 704 at different positions $P1_t$, $P2_t$, $P3_t$, $P4_t$ in the graph 700 are provided in FIGS. 7-10. It should be noted that at least one edge of the amodal cuboid touches or is otherwise in contact with data points of the LiDAR dataset 702 at each position $P1_t$, $P2_t$, $P3t$, $P4_t$. For example, a left edge 710 and a bottom edge 716 of the amodal cuboid 704 are aligned or in contact with data points of the LiDAR dataset 702 when the amodal cuboid 704 is in a first position $P1_t$, as shown in FIG. 7. A right edge 714 and the bottom edge 716 of the amodal cuboid 704 are aligned or in contact with data points of the LiDAR dataset 702 when the amodal cuboid 704 is in a second position PZ, as shown in FIG. 8. The left edge 710 and a top edge 712 of the amodal cuboid 704 are aligned or in contact with data points of the LiDAR dataset 702 when the amodal cuboid 704 is in a third position $P3_t$, as shown in FIG. 9. The top edge 712 and the right edge 714 of the amodal cuboid 704 are aligned or in contact with data points of the LiDAR dataset 702 when the amodal cuboid 704 is in a fourth position $P4_t$, as shown in FIG. 10. The present solution is not limited to the particulars of this example.

Referring again to FIG. 5, method 500 continues with 514 where coordinates for the center point of the amodal cuboid is determined at the different positions within each of the 3D graphs. For example, a LiDAR dataset 702 was acquired at time t, and plotted on a graph 700 as shown in FIG. 7. An amodal cuboid 704 was then defined in the graph 700. Four different positions $P1_t$, $P2_t$, $P3_t$, $P4_t$ for the amodal cuboid 704 in the graph 700 were arbitrarily selected as shown in FIGS. 7-10. Thus, the amodal cuboid 704 has the following four corresponding center points: a first center point 706 while in the first position $P1_t$ shown in FIG. 7; a second center point 800 while in a second position $P2_t$ shown in FIG. 8; a third center point 900 while in a third position $P3_t$ shown in FIG. 9; and a fourth center point 1000 while in a fourth position $P4_t$ shown in FIG. 10. As shown in Table 1100 of FIG. 11, the coordinates for the center point 706 while the amodal cuboid 704 is in the first position $P1_t$ are expressed by the following mathematical equation (1). The coordinates for the center point 800 while the amodal cuboid 704 is in the second position PZ are expressed by the following mathematical equation (2). The coordinates for the center point 900 while the amodal cuboid 704 is in the third position $P3_t$ are expressed by the following mathematical equation (3). The coordinates for the center point 1000 while the amodal cuboid 704 is in the fourth position $P4_t$ are expressed by the following mathematical equation (4).

$$CPC1_t = x1_t, y1_t, z1_t \quad (1)$$

$$CPC2_t = x2_t, y2_t, z2_t \quad (2)$$

$$CPC3_t = x3_t, y3_t, z3_t \quad (3)$$

$$CPC4_t = x4_t, y4_t, z4_t \quad (4)$$

where $CPC1_t$, $CPC2_t$, $CPC3_t$, $CPC4_t$ each represent a center point coordinate for the amodal cuboid encompassing data points of a LiDAR dataset acquired at time t. $x1_t$, $x2_t$, $x3_t$, $x4_t$ each represent an x-axis coordinate of a center point for an amodal cuboid encompassing data points of a LiDAR dataset acquired at time t. $y1_t$, $y2_t$, $y3_t$, $y4_t$ each represent a y-axis coordinate of a center point for an amodal cuboid encompassing data points of a LiDAR dataset acquired at time t. $z1_t$, $z2_t$, $z3_t$, $z4_t$ each represent a z-axis coordinate for a center point for an amodal cuboid encompassing data points of a LiDAR dataset acquired at time t. FIG. 11 also shows other amodal cuboid center point coordinates for the LiDAR datasets acquired at times t+1, t+2, and t+3.

In next 516, the center point coordinates are used to compute a plurality of velocity and acceleration values for the object (e.g., vehicle $102_2$ of FIG. 1) at each time t, t+1, t+2, . . . , t+n. The velocity is a function of (i) a center point coordinate (e.g., $CPC1_t$) for the amodal cuboid in a given position (e.g., $P1_t$) while encompassing data points of a LiDAR dataset acquired at a given time (e.g., t), (ii) a center point coordinate (e.g., CPC1$_{t+1}$) of the amodal cuboid in the same given position (e.g., P1$_t$) while encompassing data points of a LiDAR dataset acquired at immediately subsequent time (e.g., t+1), and (iii) a LiDAR frame rate (lfr). The velocity is generally defined by the following mathematical equation (4).

$$v_t = (CPC_{t+1} - CPC_t) * lfr \quad (4)$$

The acceleration is a function of (i) a velocity of an object computed using a center point coordinate (e.g., CPC1$_t$) for the amodal cuboid in a given position (e.g., P1$_t$) while encompassing data points of a LiDAR dataset acquired at a given time (e.g., t), (ii) a velocity of the object using a center point coordinate (e.g., CPC1$_{t+1}$) for the amodal cuboid in the same given position (e.g., P1$_t$) while encompassing data points of a LiDAR dataset acquired at an immediately subsequent time (e.g., t+1), and (iii) the LiDAR frame rate ("lfr"). The acceleration is generally defined by the following mathematical equation (5).

$$a_t = (v_{t+1} - v_t) * lfr \quad (5)$$

FIG. 11 shows the velocity and acceleration equations for the plurality of positions P1, P2, P3 and P4 of the amodal cuboid 704 in graph 700 while encompassing data points of a LiDAR dataset acquired at a t, t+1, t+2, and t+3.

Subsequently in 518, the center point coordinates are also used to compute a plurality of Single Frame Score ("SFS") values. Each SFS value is a function of (i) weighted Euclidean distances of each LiDAR point to an edge of the amodal cuboid in a given position within a 3D graph, (ii) weighted Euclidean distances to the center point of the amodal cuboid in the given position within a 3D graph, (iii) weighted edges according to a probability of occlusion. Techniques for computing Euclidean distances are well known in the art, and therefore will not be described herein. For example, an L$^2$norm operation can be performed to determine a Euclidean distance of a LiDAR point to an edge or a center point of the amodal cuboid in a given position within a 3D graph. The weights used to determine the weighted Euclidean distances of (i) are hyper parameters selected for prioritizing the four edges of the amodal cuboid. The weights used to determine the weighted Euclidean distances of (ii) are hyper parameters selected for prioritizing the center points of the amodal cuboid. The weights of (iii) are hyper parameters selected to account for a likelihood that an edge of the amodal cuboid is being occluded by the object's body. The SFS can be generally defined by the following mathematical equation (6).

$$SFS_t = |w_j L_{EPC1t}| + |w_k L_{CPC1t}| \quad (6)$$

where SFS$_t$ represents a single frame score associated with an amodal cuboid that is in a given position in a 3D graph so as to encompass a LiDAR dataset that was acquired at time t. $w_j$ and $w_k$ represent weights. L$_{EPC1t}$ represents the Euclidean distances of LiDAR data points to an edge of the amodal cuboid in a given position within the 3D graph. L$_{CPC1t}$ represents Euclidean distances of LiDAR data points to the center point of the amodal cuboid in the given position within the 3D graph. In Table 1100 of FIG. 11, SFS equations are shown for an amodal cuboid while in positions P1, P2, P3, P4 in 3D graphs so as to encompass LiDAR datasets that were acquired at times t, t+1, t+2, and t+3.

In 520 of FIG. 5, the velocity values, acceleration values and single frame score values are used to respectively compute a plurality of scores for the different cuboid positions in the 3D graphs. The score ("S") may be generally defined by the following mathematical equation (7).

$$S_t = \text{Max}\{\text{compatible state\_}\{t-1\}\}(S(\text{state\_}\{t-1\}) + w_m SFS_{t+1} + w_n |v[t+1]|^2 + w_o |a[t]|^2) \quad (7)$$

where S$_t$ represents a score associated with a LiDAR dataset that was acquired at a given time and that has plotted data points which are encompassed by an amodal cuboid having a given position within a 3D graph. Max{compatible state_{t−1}} represents a maximum value over all states at time t−1. S(state_{t−1}) represents a score computed for a state at t−1. $w_m$, $w_n$ and $w_o$ represent weights in the form of hyper parameters. SFS$_{t+1}$ represents a single frame score previously computed for an amodal cuboid encompassing a LiDAR dataset acquired at time t+1. |v[t+1]| represents an L2-norm of the velocity values previously computed for a LiDAR dataset acquired at time t+1. |a[t]| represents an L2-norm of the acceleration values previously computed for a LiDAR dataset acquired at time t. Table 1300 of FIG. 13 shows score equations for scenarios where an amodal cuboid is in positions P1, P2, P3, P4 within 3D graphs so as to encompass data points of LiDAR datasets acquired at times t, t+1, t+2 and t+3.

In 522 of FIG. 5, the scores are used as inputs to a Viterbi algorithm and/or other algorithm (e.g., a Brute force algorithm) for determining a most likely sequence of states for the object given the LiDAR datasets. The Viterbi algorithm and Brute force algorithm are well known in the art, and therefore will not be described in detail here. Still, it should be generally noted that the Viterbi algorithm is a dynamic programming algorithm for finding a most likely sequence of hidden states that results in a sequence of observed events. Generally, in the scenario shown in FIGS. 6-13, the Viterbi algorithm involves: finding a score S at time t=2 by looking at each of the previous 16 scores and adding to each of the 16 scores a weighted time t=1 acceleration magnitude, a time t=2 velocity magnitude, and a t=3 single frame score; finding a best choice of state by recording at each time a maximum score and a previous state that maximized the score; reading backwards from an end to find a best set of states. Table 1200 of FIG. 12 show illustrative mathematical expressions for the 16 possible states at each time t−1, t, t+1 and t+2.

An illustrative pseudo-code for a Viterbi algorithm employed by the present solution is provided below. The inputs to the Viterbi algorithm are: the observation space O={S$_{P1t}$, S$_{P2t}$, S$_{P3t}$, S$_{P4t}$, S$_{P1t+1}$, S$_{P2t+1}$, S$_{P3t+1}$, S$_{P4t+1}$, S$_{P1t+2}$, S$_{P2t+2}$, S$_{P3t+2}$, S$_{P4t+2}$, S$_{P1t+3}$, S$_{P2t+3}$, S$_{P3t+3}$, S$_{P4t+3}$}; the state space={SV$_{1,t-1}$, SV$_{2,t-1}$, ..., SV$_{16,t-1}$, SV$_{1,t}$, SV$_{2,t}$, ..., SV$_{16,t}$, SV$_{1,t+1}$, SV$_{2,t+1}$, ..., SV$_{16,t+1}$, SV$_{1,t+2}$, SV$_{2,t+2}$, ..., SV$_{16,t+2}$}; an array of initial probabilities P=(p$_1$, p$_2$, ..., p$_R$); a sequence of observations OB=(ob$_1$, ob$_2$, ..., ob$_r$); a transition matrix A of R×R; and an emission matrix B of R×R.

```
function VITRERBI (O, ST, P, OB, A, B): X
  for each state i=1, 2, ..., R
    T₁[i,1]←pᵢ·B_iobl
    T₂[i,1]←0
  end for
  for each observation j=2, 3, ..., T do
    for each state i=1, 2, ..., R do
      T₁[i,j]←max (T₁[r, j−1]·A_ri·B_iobj)
      T₂[i,j]←arg max (T₁[r, j−1]·A_ri·B_iobj)
    end for
  zⱼ←arg max (T₁[r, T])
  x_T←SV_zj−1
  for j=T, T−1, ..., 2 do
    zⱼ₋₁←T₂[zⱼ, j])
    xⱼ₋₁←SV_zj−1
  return X
end function
```

The present solution is not limited to the particulars of the above pseudo-code.

The most likely sequence of states for the object can be used to control various autonomous driving operations of the AV. Accordingly, method 500 includes optional operations 524-528 for this purpose. In optional 524, the most likely sequence of states for the object is used to train a machine learning radar detection algorithm employed by a radar system (e.g., radar system 266 of FIG. 2) of the autonomous vehicle (e.g., AV 102$_1$ of FIG. 1) to more accurately determine the velocity and acceleration of any further detected object. Machine learning radar detection algorithms are well known in the art, and therefore will not be described here. Any known or to be known machine learning radar detection algorithm can be used here.

In optional 526, the autonomous vehicle (e.g., AV 102$_1$ of FIG. 1) uses the velocity and acceleration values generated by the trained radar detection algorithm to facilitate tracking of object movements, predictions of object trajectories, planning of vehicle movement/motion, and/or collision avoidance with a higher degree of confidence. Methods for object movement tracking, object trajectory predicting, vehicle movement/motion planning, and collision avoidance are well known in the art, and therefore will not be described here. Any known or to be known method for object movement tracking, object trajectory predicting, vehicle movement/motion planning, and collision avoidance can be used here.

In optional 528, the autonomous vehicle performs operations to implement an autonomous driving operation that considers the most likely sequence of states for the object. The autonomous driving operation can include, but is not limited to, object movement tracking, object trajectory predicting, vehicle movement/motion planning, and collision avoidance. For example, in some scenarios, 528 can involve performing the following operations by the vehicle on-board computing device (e.g., device 220 of FIG. 2): determining a vehicle trajectory for the vehicle that is in motion; detecting an object within a given distance from the vehicle (e.g., using radar or LiDAR data); generating at least one possible object trajectory for the object which was detected using the most likely sequence of states for the object; using the vehicle trajectory and at least one possible object trajectory to determine whether there is an undesirable level of risk that a collision will occur between the vehicle and the object; modifying the vehicle trajectory when a determination is made that there is an undesirable level of risk that the collision will occur; and causing the vehicle to move according to the modified vehicle trajectory. The present solution is not limited to the particulars of this example. Subsequently, 530 is performed, where method 500 ends or other operations are performed.

The above described amodal cuboid based approach can be used in a plurality of different applications. In a first scenario, a manually labeled cuboid in the distance surrounds a small cluster of LiDAR returns. The correct amodal cuboid should shift around these LiDAR points. For example, a bus is in a lane but forwards in the distance will have only LiDAR returns on the rear of the bus. It is amodally correct to fit the cuboid with LiDAR on the rear of the bus rather than on the front of the bus.

In a second scenario, a manually label cuboid is partially occluded by another object, or may in fact be in the LiDAR shadow of another object. The dynamics come into play here, and try to minimize acceleration meaning that the algorithm tries to interpolate through shadows and perform a balanced interpolation through partial shadows.

In a third scenario, a cuboid near the LiDAR source will have many returns that speak for the extent of the amodal cuboid. A length, width and height of the object may be determined when the object is near or otherwise in proximity to the AV. This information may be translated across all other frames of LiDAR data.

Although the present solution has been illustrated and described with respect to one or more implementations, equivalent alterations and modifications will occur to others skilled in the art upon the reading and understanding of this specification and the annexed drawings. In addition, while a particular feature of the present solution may have been disclosed with respect to only one of several implementations, such feature may be combined with one or more other features of the other implementations as may be desired and advantageous for any given or particular application. Thus, the breadth and scope of the present solution should not be limited by any of the above described embodiments. Rather, the scope of the present solution should be defined in accordance with the following claims and their equivalents.

What is claimed is:

1. A method for controlling an autonomous vehicle, comprising:
    performing operations by the autonomous vehicle to generate a plurality of LiDAR datasets that measure a distance from the autonomous vehicle to an object at a plurality of different times;
    plotting each of the LIDAR datasets on a 3D graph;
    defining an amodal cuboid on each of the 3D graphs that encompasses all of the LIDAR data points in a respective one of the LiDAR datasets;
    selecting a plurality of different positions for the amodal cuboid in the 3D graphs;
    determining coordinates for a center point of the amodal cuboid at the different positions within each of the 3D graphs;
    using the center point coordinates to compute a plurality of velocity values and a plurality of acceleration values for the object at each of the different times;
    using the center point coordinates to compute a plurality of single frame score values that are each a function of (i) weighted Euclidean distances of each LiDAR point to an edge of the amodal cuboid in a given position within a respective one of the 3D graphs, (ii) weighted Euclidean distances of each LiDAR point to the center point of the amodal cuboid in the given position within the respective one of the 3D graphs, and (iii) weighted edges according to a probability of occlusion;
    using the velocity values, acceleration values and single frame score values to respectively compute a plurality of scores for the different cuboid positions in the 3D graphs;
    using the plurality of scores as inputs to a Viterbi algorithm for determining a most likely sequence of states for the object given the LiDAR datasets; and
    using the most likely sequence of states for the object by the autonomous vehicle to facilitate at least one of object movement tracking, object trajectory predicting, vehicle movement/motion planning, and collision avoidance.

2. The method according to claim 1, wherein the object is a vehicle.

3. The method according to claim 1, wherein the different positions of the amodal cuboid within each of the 3D graphs are arbitrarily selected.

4. The method according to claim 1, wherein the LiDAR datasets are processed by an on-board computing device of the autonomous vehicle to determine the most likely sequence of states for the object.

5. The method according to claim 1, further comprising providing the plurality of LiDAR datasets to a remote computing device where the most likely sequence of states for the object is determined.

6. The method according to claim 1, wherein each velocity value of the plurality of velocity values is a function of (i) a center point coordinate for the amodal cuboid in a given position while encompassing data points of a first LiDAR dataset of the plurality of LiDAR datasets that was acquired at a given time, (ii) a center point coordinate of the amodal cuboid in the given position while encompassing data points of a second LiDAR dataset of the plurality of LiDAR datasets that was acquired at immediately subsequent time, and (iii) a LiDAR frame rate.

7. The method according to claim 1, wherein each acceleration value of the plurality of acceleration values is a function of (i) a velocity of the object computed using a center point coordinate for the amodal cuboid in a given position while encompassing data points of a first LiDAR dataset of the plurality of LiDAR datasets that was acquired at a given time, (ii) a velocity of the object using a center point coordinate for the amodal cuboid in the given position while encompassing data points of a second LiDAR dataset of the plurality of LiDAR datasets that was acquired at an immediately subsequent time, and (iii) a LiDAR frame rate.

8. The method according to claim 1, wherein each single frame score value of the plurality of single frame score values is defined by mathematical equation $$SFS_t = |w_j L_{EPC1t}| + |w_k L_{CPC1t}|,$$

where: $SFS_t$ represents a single frame score associated with the amodal cuboid that is in a given position in a given 3D graph so as to encompass a given LiDAR dataset of the plurality of LiDAR datasets that was acquired at time t; $w_j$ and $w_k$ represent weights; $L_{EPC1t}$ represents Euclidean distances of LiDAR data points to an edge of the amodal cuboid in the given position within the given 3D graph; and $L_{CPC1t}$ represents Euclidean distances of LiDAR data points to a center point of the amodal cuboid in the given position within the given 3D graph.

9. The method according to claim 1, wherein each score of the a plurality of scores is defined by mathematical equation $$S_t = \mathrm{Max\{compatible\ state\_\{t-1\}\}}(S(\mathrm{state\_\{t-1\}}) + w_m SFS_{t+1} + w_n |v[t+1]|^2 + w_o |a[t]|^2)$$

where: $S_t$ represents a score associated with a first LiDAR dataset of the LiDAR datasets that was acquired at a given time and that has plotted data points which are encompassed by the amodal cuboid having a given position within a given 3D graph; Max{compatible state_{t-1}} represents a maximum value over all states at time t-1; S(state_{t-1}) represents a score computed for a state at t-1; $w_m$, $w_n$ and $w_o$ represent weights; $SFS_{t+1}$ represents a single frame score previously computed for the amodal cuboid encompassing a second LiDAR dataset of the plurality of LiDAR datasets that was acquired at an immediately subsequent time; |v[t+1]| represents an L2-norm of the velocity values previously computed for the second LiDAR dataset; and |a[t]| represents an L2-norm of the acceleration values previously computed for the first LiDAR dataset.

10. A system, comprising:
a LIDAR system configured to generate a plurality of LiDAR datasets that measure a distance from an autonomous vehicle to an object at a plurality of different times;
a processor configured to obtain the plurality of LIDAR datasets; and
a non-transitory computer-readable storage medium comprising programming instructions that are configured to cause the processor to implement a method for controlling an autonomous vehicle, wherein the programming instructions comprise instructions to:
plot each of the LiDAR datasets on a 3D graph;
define an amodal cuboid on each of the 3D graphs that encompasses all of the LiDAR data points in a respective one of the LiDAR datasets;
determine coordinates for a center point of the amodal cuboid at a plurality of different positions within each of the 3D graphs;
use the center point coordinates to compute a plurality of velocity values and a plurality of acceleration values for the object at each of the different times;
use the center point coordinates to compute a plurality of single frame score values that are each a function of (i) weighted Euclidean distances of each LiDAR point to an edge of the amodal cuboid in a given position within a respective one of the 3D graphs, (ii) weighted Euclidean distances of each LiDAR point to the center point of the amodal cuboid in the given position within the respective one of the 3D graphs, and (iii) weighted edges according to a probability of occlusion;
use the velocity values, acceleration values and single frame score values to respectively compute a plurality of scores for the different cuboid positions in the 3D graphs;
use the plurality of scores as inputs to a Viterbi algorithm for determining a most likely sequence of states for the object given the LiDAR datasets; and
cause the autonomous vehicle to use the most likely sequence of states to facilitate at least one of object movement tracking, object trajectory predicting, vehicle movement/motion planning, and collision avoidance.

11. The system according to claim 10, wherein the object is a vehicle.

12. The system according to claim 10, wherein the different positions of the amodal cuboid within each of the 3D graphs are arbitrarily selected.

13. The system according to claim 10, wherein the processor comprises an on-board computing device of the autonomous vehicle.

14. The system according to claim 10, wherein the processor comprises a computing device remote from the autonomous vehicle.

15. The system according to claim 10, wherein each velocity value of the plurality of velocity values is a function of (i) a center point coordinate for the amodal cuboid in a given position while encompassing data points of a first LiDAR dataset of the plurality of LiDAR datasets that was acquired at a given time, (ii) a center point coordinate of the amodal cuboid in the given position while encompassing data points of a second LiDAR dataset of the plurality of LiDAR datasets that was acquired at immediately subsequent time, and (iii) a LiDAR frame rate.

16. The system according to claim 10, wherein each acceleration value of the plurality of acceleration values is a function of (i) a velocity of the object computed using a center point coordinate for the amodal cuboid in a given position while encompassing data points of a first LiDAR dataset of the plurality of LiDAR datasets that was acquired at a given time, (ii) a velocity of the object using a center point coordinate for the amodal cuboid in the given position while encompassing data points of a second LiDAR dataset of the plurality of LiDAR datasets that was acquired at an immediately subsequent time, and (iii) a LIDAR frame rate.

17. The system according to claim 10, wherein each single frame score value of the plurality of single frame score values is defined by mathematical equation $$SFS_t = |w_j L_{EPC1t}| + |w_k L_{CPC1t}|,$$

where: $SFS_t$ represents a single frame score associated with the amodal cuboid that is in a given position in a given 3D graph so as to encompass a given LiDAR dataset of the plurality of LiDAR datasets that was acquired at time t; $w_j$ and $w_k$ represent weights; $L_{EPC1t}$ represents Euclidean distances of LiDAR data points to an edge of the amodal cuboid in the given position within the given 3D graph; and $L_{CPC1t}$ represents Euclidean distances of LiDAR data points to a center point of the amodal cuboid in the given position within the given 3D graph.

18. The system according to claim 10, wherein each score of the a plurality of scores is defined by mathematical equation $$S_t = \text{Max}\{\text{compatible state\_}\{t-1\}\}(S(\text{state\_}\{t-1\}) + w_m SFS_{t+1} + w_n |v[t+1]|^2 + w_o |a[t]|^2)$$

where: $S_t$ represents a score associated with a first LiDAR dataset of the LiDAR datasets that was acquired at a given time and that has plotted data points which are encompassed by the amodal cuboid having a given position within a given 3D graph; Max{compatible state\_{t−1}} represents a maximum value over all states at time t−1; S(state\_{t−1}) represents a score computed for a state at t−1; $w_m$, $w_n$ and $w_o$ represent weights; $SFS_{t+1}$ represents a single frame score previously computed for the amodal cuboid encompassing a second LiDAR dataset of the plurality of LiDAR datasets that was acquired at an immediately subsequent time; |v[t+1]| represents an L2-norm of the velocity values previously computed for the second LiDAR dataset; and |a[t]| represents an L2-norm of the acceleration values previously computed for the first LiDAR dataset.

* * * * *